(12) United States Patent
Ergert

(10) Patent No.: US 12,461,040 B2
(45) Date of Patent: Nov. 4, 2025

(54) INSPECTION SYSTEM

(71) Applicant: MA micro automation GmbH, St. Leon-Rot (DE)

(72) Inventor: Bodo Ergert, Heidelberg (DE)

(73) Assignee: MA Mircro Automation GmbH, St. Leon-Rot (DE)

( * ) Notice: Subject to any disclaimer, the term of this patent is extended or adjusted under 35 U.S.C. 154(b) by 136 days.

(21) Appl. No.: 18/272,164

(22) PCT Filed: Jan. 11, 2022

(86) PCT No.: PCT/EP2022/050410
§ 371 (c)(1),
(2) Date: Jul. 13, 2023

(87) PCT Pub. No.: WO2022/152682
PCT Pub. Date: Jul. 21, 2022

(65) Prior Publication Data
US 2024/0142388 A1    May 2, 2024

(30) Foreign Application Priority Data
Jan. 13, 2021    (DE) .................. 10 2021 100 562.0

(51) Int. Cl.
*G01N 21/95* (2006.01)
(52) U.S. Cl.
CPC ..... *G01N 21/95* (2013.01); *G01N 2201/0636* (2013.01)
(58) Field of Classification Search
CPC .. G01N 21/909; G01N 21/9036; G01N 21/95; G01N 2201/0636; G01B 11/2433
See application file for complete search history.

(56) References Cited

U.S. PATENT DOCUMENTS 3,858,983 A * 1/1975 Foster .................. G01B 11/022
356/602
4,025,201 A    5/1977 Deane
(Continued)

FOREIGN PATENT DOCUMENTS

CN    211856380 U    11/2020
DE    2617457 A1    11/1976
(Continued)

OTHER PUBLICATIONS

The International Bureau of WIPO, English translation for the International Preliminary Report of Patentability for PCT/EP2022/050410, Jul. 27, 2023, pp. 1-9.
(Continued)

*Primary Examiner* — Sang H Nguyen
(74) *Attorney, Agent, or Firm* — Cahn & Samuels, LLP

(57) ABSTRACT

The invention relates to an inspection system for checking elongate workpieces (2), more particularly injection-moulded parts such as pipette tips, which have a workpiece longitudinal axis, comprising: (i) a holding device (3) for holding a plurality of workpieces to be checked, which are arranged on the holder preferably in a plurality of rows (R1, R2) separated from one another by a distance d, (ii) an illumination device (4) comprising at least one light source (4a), (iii) an optical detection means (6), the workpiece being arranged in the beam path (S1, S2) of the light emitted from the light source between the light source and the optical detection means, and the optical detection means detecting the image of the workpiece generated by the illumination device, (iv) an optical system (5) for orienting the light emitted from the light source preferably laterally towards the workpiece to be checked arranged on the holder, and from the workpiece towards the optical detection means, (v) preferably an evaluation device (7), which is connected in a signal-transmitting manner to the optical detection means (Continued)

Figure 1:
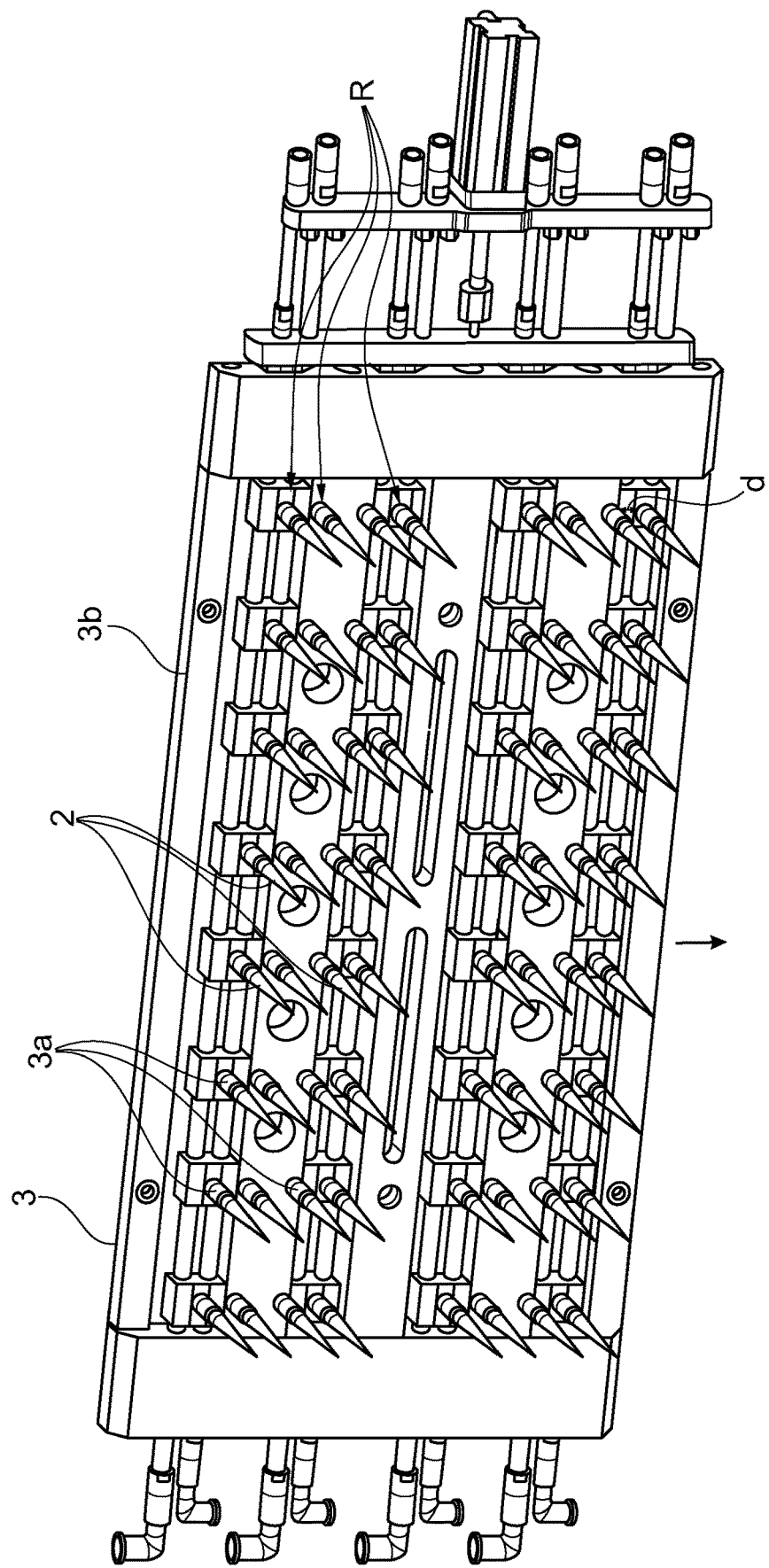

and permits an evaluation of the workpiece image. The optical system is designed to generate a preferably non-distorted shadow image of the workpiece from at least one direction transverse to the workpiece longitudinal axis and to project the shadow image preferably in non-distorted fashion onto the detection means.

17 Claims, 8 Drawing Sheets

(56) References Cited

U.S. PATENT DOCUMENTS

| | | | | |
|---|---|---|---|---|
| 4,498,778 | A | * | 2/1985 | White .................... G01B 11/25 356/243.4 |
| 4,974,165 | A | * | 11/1990 | Locke ................ G05B 19/4166 700/192 |
| 5,056,922 | A | * | 10/1991 | Cielo ................... G01B 11/245 356/604 |
| 5,114,230 | A | * | 5/1992 | Pryor ................. G01B 11/2433 356/625 |
| 5,948,985 | A | * | 9/1999 | Brautigan .............. G01N 29/28 73/622 |
| 8,668,793 | B2 | * | 3/2014 | Engelbart ................ B29C 70/32 156/379 |
| 2006/0092276 | A1 | * | 5/2006 | Ariglio ................. G01N 21/896 348/132 |
| 2007/0097381 | A1 | * | 5/2007 | Tobiason ................ G01B 11/25 356/604 |
| 2015/0248570 | A1 | * | 9/2015 | Johansen ........... G06K 7/10722 235/462.05 |
| 2017/0307541 | A1 | | 10/2017 | Offenborn et al. |
| 2020/0376672 | A1 | | 12/2020 | Wolf et al. |
| 2021/0181223 | A1 | | 6/2021 | Zerza et al. |

FOREIGN PATENT DOCUMENTS

| | | |
|---|---|---|
| DE | 10 2017 120 376 B3 | 1/2019 |
| JP | 2000018919 A | 1/2000 |

OTHER PUBLICATIONS

Deutsches Patent-und Markenamt, Examination Report for DE 10 2021 100 562.0, Dec. 17, 2021, pp. 1-6.
European Patent Office, International Search Report for PCT/EP2022/050410, May 12, 2022, pp. 1-4.
European Patent Office, Written Opinion for PCT/EP2022/050410, May 12, 2022, pp. 1-8.
European Patent Office, English Abstract for CN211856380U, printed on Jul. 6, 2023.
Japanese Patent Office, English Abstract for JP2000018919A, Jan. 21, 2000.

* cited by examiner

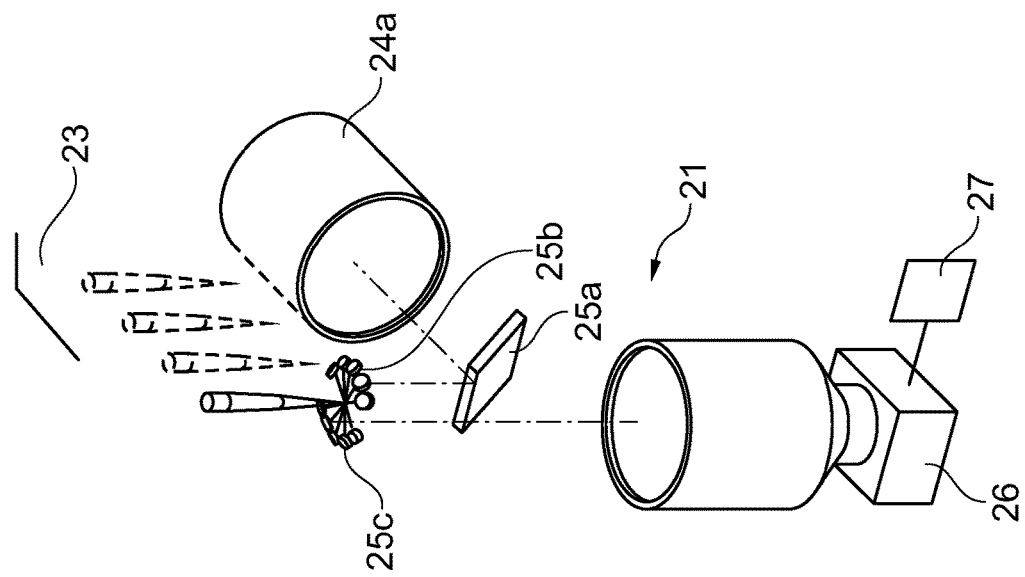
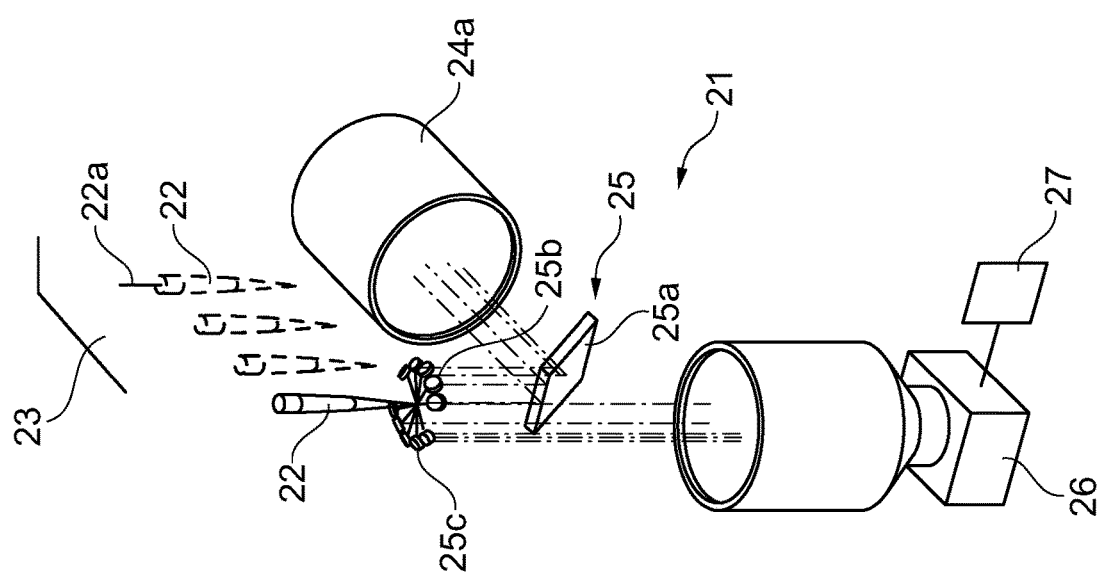
Fig. 4a
Fig. 4b

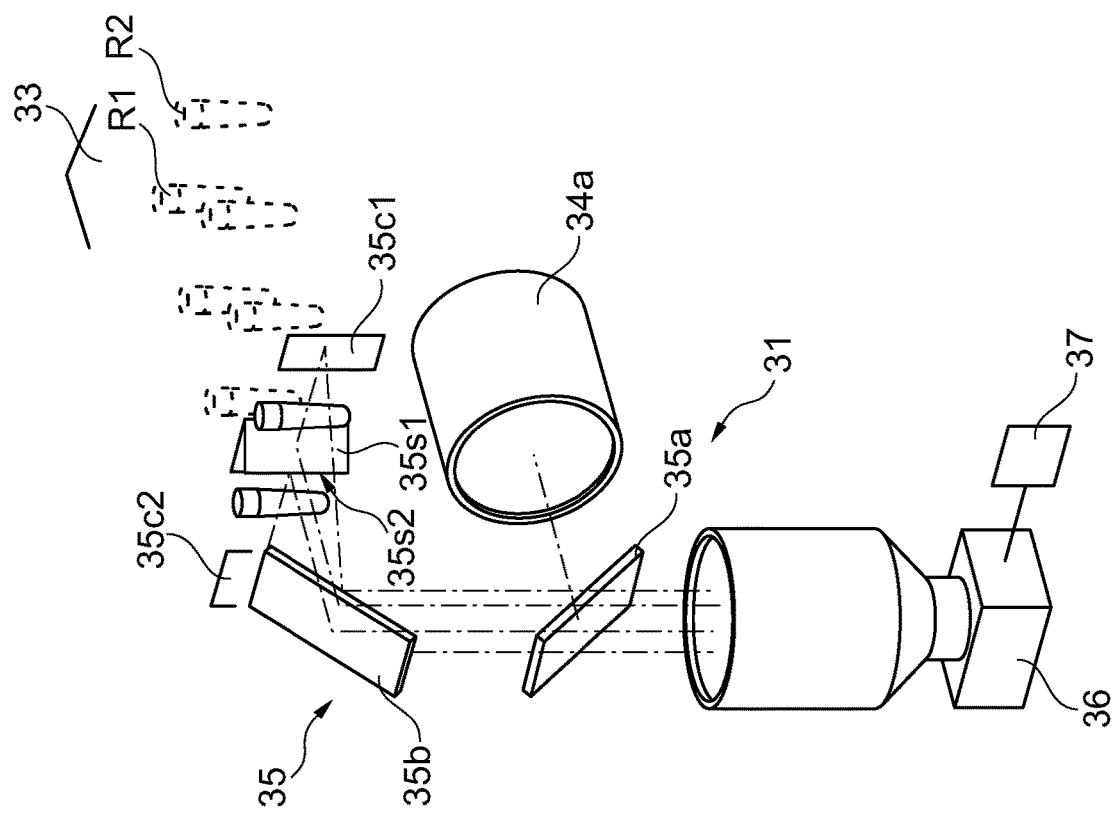
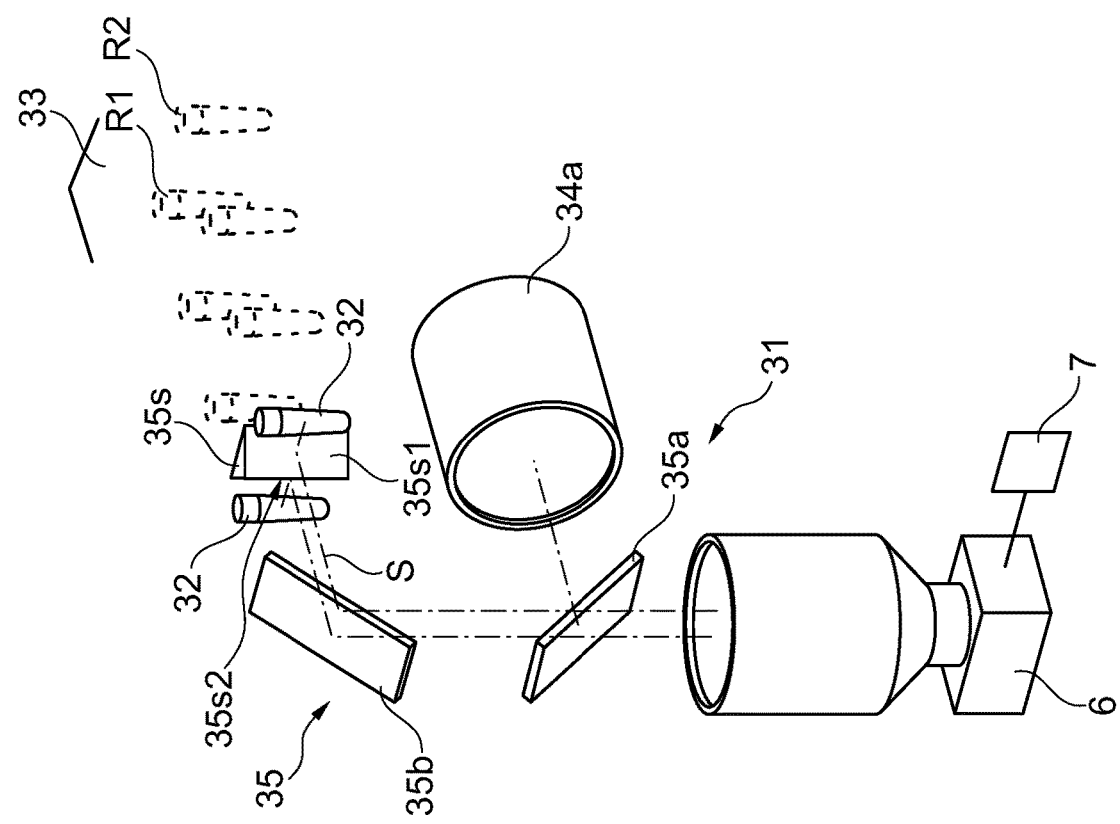

INSPECTION SYSTEM

The invention relates to an inspection system according to the generic part of claim 1 and to an inspection method using such an inspection system.

Inspection systems of this type are used in particular to perform a quality check on elongated injection-molded parts immediately after their manufacture. Such workpieces are used for example in the medical field, such as pipette tips, cup-shaped receptacles for medical specimens to be examined or substances to be analyzed, or the like. Such workpieces must be manufactured with a very high degree of precision, as this would otherwise impair the work processes carried out using such workpieces, such as analysis processes. For example, in the case of workpieces produced by injection molding, defects can occur, such as undesirable burrs, depressions, irregularities in the workpiece geometry such as those caused by warpage or the like, but especially insufficiently injected areas, which leads to rejects of such workpieces. High demands are thus placed on the inspection system with regard to the detection of defective workpieces.

Furthermore, inspection systems of this type are often an integral part of an automated production line, which usually extends from the manufacture of the workpieces in a molding tool, such as an injection molding machine, to workpiece inspection and packaging of the workpieces. However, high production speeds also require correspondingly short inspection times for the respective workpiece by means of the inspection system. The inspection system must therefore be capable of being integrated into such a production system. Furthermore, the inspection system must have a compact design for this purpose, since the workpieces are often close together on the holding device and/or little installation space is available.

From DE 10 2017 120 376 A1, an inspection device is known in which the respective workpieces can be inspected as they pass through the inspection device. This inspection device has a concave mirror arrangement in order to record an image of the outside of the workpiece reflected in it by means of a camera. However, the disadvantage of this device is that the mirror image generated of the workpiece has stronger optical distortions compared to the actual workpiece, which leads to lacking reliability of the inspection process. Dimensional inspections and measurements are very limited or impossible with the concave mirror arrangement. Furthermore, the use of a mirror image of the workpiece under inspection has been found to be disadvantageous for certain applications and to eliminate certain workpiece defects, such as minor burrs, inaccuracies in the opening of the pipette tip or, in particular, surface defects such as insufficient injection molding of workpiece areas are not always adequately detected.

The invention is thus based on the object of providing an inspection system of the type described which partially or completely eliminates the disadvantages described, which enables particularly reliable detection of defects in the workpiece and which is inexpensive. Furthermore, the object is to provide a corresponding inspection method for the inspection of workpieces.

This object is achieved by an inspection system according to the independent claims as well as by an inspection method as described herein. Preferred embodiments of the subject matter of the invention are apparent from the subclaims.

The inspection system according to claim 1 comprises an optical system which, when the workpiece is radiated with the light source of the illumination means, generates a shadow image of the workpiece, preferably an undistorted shadow image, from at least one direction transverse to the workpiece longitudinal axis, and projects the generated shadow image onto the detection means, preferably without distortion, or is configured for this purpose.

In the course of making the invention, it has been found that by generating a shadow image of the workpiece by means of the optical system, various workpiece defects such as, in particular, insufficient injection of superficial component regions, in particular in the region of an end section of the respective workpiece such as, for example, a tip or a bottom region, can be detected particularly reliably. The shadow image here exhibits a very high contrast, namely a darker or dark or black shadow image, to the surrounding lighter area of the workpiece environment, which enables a particularly reliable inspection. Insufficient surface injection can be detected as a missing area of the edge region of the shadow image. Also, burrs, local elevations, film buildup of excess material or other irregularities are particularly easy to detect. Such workpiece defects, especially in injection-molded parts, can be detected particularly reliably and with high image sharpness by the workpiece shadow image due to the high light/dark contrast of the same to the adjacent image area. This also applies in particular to the free end of the respective workpiece facing away from the workpiece holder, such as the area of a pipette tip opening. Furthermore, tolerance deviations of the workpiece geometry can be detected particularly reliably by the shadow image. This applies in each case, in particular, to the region of the said free end of the workpiece, such as the region of a pipette tip opening or the bottom region of a container.

It has been found that due to the high contrast of the shadow image to the surrounding image area, particularly short inspection times for the workpiece or exposure times are possible, which can also be in the range of a few microseconds. The inspection system can thus be used particularly advantageously in an automated production line for manufacturing the workpiece, where the process speed of the production line only has to be reduced very slightly or not at all when the workpiece passes through the inspection system, i.e., the production line can also be operated continuously at high speed without this impairing the sharpness of the shadow image generated or its evaluation.

Furthermore, due to the aforementioned high contrast of the shadow image, a relatively simple evaluation algorithm with a high evaluation speed can be used in the evaluation unit, which is additionally beneficial for a high production speed of the production line. In addition, it has been found that due to the relatively simple evaluation algorithm and/or the high sharpness of the shadow image, it can be determined particularly reliably by means of the evaluation unit whether the respective workpiece has perfect quality or is defective and must be removed.

The advantages described are particularly evident in comparison with inspection systems in which the image of the workpiece is generated in incident light on the workpiece, for example by generating a mirror image thereof, in which case a high light component of light diffusely emitted by the workpiece results.

The respective workpiece can especially be an injection-molded component. The workpiece may also be a container, for instance, such as for analytical purposes and/or for carrying out chemical reactions on a microscale, but without limitation thereto, so that even relatively small workpieces can be inspected very reliably.

Preferably, the optical system is designed to generate a shadow image of the workpiece which is substantially free of distortion or free of distortion from at least one direction transverse to the longitudinal axis of the workpiece and/or to project the generated shadow image onto the detection means preferably at least substantially undistorted or undistorted. Imaging errors of the workpiece, as they occur when using curved concave mirrors, are thus reduced or avoided. This increases the reliability of the workpiece inspection. The optical system of the inspection system according to the invention thus preferably does not have any curved concave mirrors, especially preferably no optical elements with curved optical surfaces such as curved reflection surfaces, except for the optics of the light source and/or the lens of the detection means. But generally, a certain, usually rough inspection of the workpieces can be carried out even when distorted shadow images are generated.

The illumination device can comprise several light sources, particularly if several workpieces or, if necessary, also several rows of workpieces are to be inspected simultaneously by means of the inspection system. Preferably, for generating a shadow image of the workpiece to be inspected, each workpiece is radiated by exactly one light source, although one light source may optionally also irradiate several workpieces, preferably simultaneously, especially if a beam path splitter is used. If necessary, multiple light sources can also irradiate one workpiece, for instance from different directions, to generate several shadow images of the given workpiece from different directions and, if necessary, to generate several shadow images of the given workpiece from different directions simultaneously or staggered. The workpieces can be moved past the respective light source or the multiple light sources by means of a movable holding device in order to inspect the respective workpiece using the shadow image.

The optical detection means can preferably be configured as a camera, but also in other suitable ways, such as an optical sensor, in particular a surface sensor, or the like. A camera as a detection means has proven particularly useful, since it reliably captures the shadow image of the workpiece and enables image processing of the shadow image in a simple manner. Processing of the camera image by a corresponding evaluation device is particularly easy. Preferably, during the detection of the two or more shadow images of workpieces of different workpiece rows, the detection means is arranged stationary or unchanged in position with respect to the optical system of the inspection device and/or with respect to the light source generating the respective shadow images.

Preferably, the inspection system comprises an evaluation device which is connected to the optical detection means in a signal-transmitting manner and wherein any material defects can be determined and analyzed by means of the evaluation device. In particular, the evaluation device can compare the shadow image of the workpiece (generally: "shadow image") detected by means of the detection means with a reference image of a faultless workpiece. A corresponding reference component can also be stored in the evaluation device as a faultless workpiece in order to perform the comparison or evaluation. It is understood that the comparison of the shadow image can also be made with a data set which corresponds to a faultless workpiece. The evaluation can generally be performed using an image processing method, a computational method or by other suitable means.

Preferably, the optical detection means and the evaluation device connected thereto in a signal-transmitting manner, which evaluates the detected shadow images preferably using a computing device, are configured in such a way that the concentricity of the workpiece can be detected or calculated and/or determined or calculated by means of this plurality of shadow images. The concentricity of the workpiece is to be understood such that one or more longitudinal sections, preferably comprising the free end of the workpiece, is/are respectively arranged in the longitudinal axis of the workpiece in directions at an angle to one another, which directions are respectively arranged perpendicularly to the workpiece longitudinal axis. In particular, the two aforementioned directions can enclose an angle of 90° to one another. Thus, when the workpiece is rotated about its longitudinal axis, the position of the free workpiece towards its longitudinal axis does not change when the workpiece is viewed in its longitudinal direction from the free end of the workpiece. The image of a round end of a workpiece, such as a round pipette tip opening, thus appears as a circle with the same diameter of the free end when the workpiece is rotated. The inspection system according to the invention is particularly adapted to be able to reliably detect such a roundness or deviations therefrom.

For generating an at least substantially undistorted or undistorted shadow image of the workpiece, the optical system preferably has one or more plane mirrors, which have proven to be particularly advantageous for enabling the desired reliable workpiece inspection and for generating a shadow image which is as low in distortion or undistorted as possible and/or for projecting it undistorted onto the detection means. Generally within the scope of the invention, "undistorted" is also to be understood in the specific sense as at least substantially free of distortion or, in particular, free of distortion. Such a plane mirror is preferably arranged in the beam path between the light source of the illumination device and the workpiece, wherein preferably several or all of the optical elements of the optical system between the light source and the workpiece consist of plane mirrors. By using the plane mirror(s), a particularly low-distortion or distortion-free image generation of the workpiece is made possible overall, in particular also in the form of a shadow image of the workpiece, since optical imaging errors are reduced or avoided. Furthermore, plane mirrors are optical elements that can be produced at particularly low cost, for example in contrast to a complicated lens system, and require only a small amount of installation space, which is of particular advantage in the case of workpieces to be inspected that are close together.

Preferably, the optical system has at least two or more plane mirrors arranged one behind the other in the beam path between the light source and the workpiece. Preferably, all of the optical elements between the light source and the workpiece are designed as plane mirrors, which means that exclusively plane mirrors are provided. Preferably and particularly in combination therewith, at least one or more or all of the optical elements between the workpiece and the optical detection means are configured as plane mirrors, which means that exclusively plane mirrors are provided. Preferably, the optical element of the optical system arranged in the direction of the beam path directly in front of the workpiece and/or directly behind the workpiece is a plane mirror. This provides for a particularly low-distortion or practically distortion-free generation of a shadow image of the workpiece and/or a particularly low-distortion or practically distortion-free detection of the generated shadow image by the optical detection means, which enables a particularly reliable inspection of the workpiece.

Preferably, the optical system is configured in such a way that the beams incident on the workpiece, which generate the shadow image of the workpiece, are a light beam consisting of rays aligned at least substantially parallel or parallel to one another. Preferably, especially in combination with the above feature, the beams of the shadow image incident on the optical detection means are aligned at least substantially parallel or parallel to one another. This enables a particularly low-distortion or distortion-free generation of a shadow image of a workpiece. The rays of the light beam incident on the workpiece can diverge or converge by ≤±20°, preferably ≤±10° or ≤±5° or ≤±2°, with respect to the direction of incidence of the light beam on the workpiece, and are particularly preferably parallel to one another. In this case, the cross-section of the light beam preferably covers the entire width or cross-section of the workpiece section to be inspected.

Particularly advantageously, the beam path between the optical element on the illumination side immediately in front of the workpiece and/or the optical element on the detection means side immediately behind the workpiece is aligned at least substantially perpendicular or perpendicular to the longitudinal axis of the workpiece. This allows material defects and deviations from the nominal geometry in the region of the free end of the workpiece to be detected with particular reliability. The beam path between the optical element on the illumination center side and the workpiece and/or the beam path between the optical element on the detection center side and the workpiece can enclose an angle of ≤20° or ≤15°, preferably ≤10° or ≤5°, particularly preferably about 0° to the perpendicular of the longitudinal axis of the workpiece, the optical element being arranged in each case directly on the workpiece with respect to the respective beam path. The optical element arranged directly on the illumination center side and/or on the detection center side, which is thus arranged closest to the workpiece in the beam path, preferably is a plane mirror.

Preferably, the beam path of the light emitted by the illumination means and detected by the optical detection means is telecentric on the object side and/or on the image side, particularly preferably on both sides. In particular, the optical detection means can comprise a telecentric lens. This enables an at least substantially undistorted or undistorted generation of a shadow image of the workpiece and the at least substantially undistorted or undistorted detection thereof by the detection means and thus a particularly reliable verification of the perfect quality of the workpiece to be inspected. It is generally preferred that the light beams incident on the workpiece are parallel beams. It is particularly preferred that the light beams incident on the optical detection means are generally parallel beams.

Preferably, the beam path includes at least one beam path splitter, which splits the light emitted from the light source of the illumination means into at least two separate partial beams and directs the at least two partial beams onto the workpiece, i.e., one and the same workpiece, for generating at least two shadow images thereof. In this way, a shadow image of the workpiece can be generated from several different directions, whereby a particularly reliable detection of any workpiece defects is possible, which workpiece defects can be detected to different degrees by the optical detection means when viewing the workpiece from different directions. The beam path splitter preferably has optically effective surfaces in the form of plane mirrors which effect the beam splitting. Preferably, all of the optically effective surfaces of the beam path splitter are configured as plane mirrors. For example, the beam path splitter can be in the form of two plane mirrors arranged at an angle to one another, with the vertex of the angle preferably placed in the beam path. At the vertex of the angle, the two optical elements, in particular plane mirrors, of the beam path splitter can converge in an edge. The angle enclosed between the two optical elements of the beam path splitter can be <180° or <170°, in particular 145° to 30°, especially preferably 120° to 60°, in particular about 90°, but also 160° to 90°, for example, the enclosed angle being arranged on the side of the vertex facing away from the beam path. In addition, this provides a particularly cost-effective design of the inspection system, since independent illumination devices for generating a respective shadow image of the workpiece from a specific direction are respectively avoided, for example. Alternatively, a beam path splitter can also be constructed for instance in such a way that the light emitted by the illumination device is emitted to a first optical element, which preferably is a plane mirror, in this case occupies an illuminated area F1, which is preferably radiated with an at least substantially uniform luminance over the area and wherein in this area, the light is emitted onto at least two or more optical elements with a respective area F2, each of the optical elements preferably being configured as plane mirrors. The extension of the light source, e.g., also as a point source, can in this case be at least the area F1. The area F1 is here preferably larger than the area F2, preferably the area F1 is at least as large as the sum of the areas F2, the light emitted from the areas F2 preferably being emitted directly onto the workpiece to generate shadow images of the same. The number of shadow images generated may be equal to the number of the areas F2 that are provided. The areas F1 and F2 are each preferably planar surfaces, preferably each formed by a plane mirror.

Preferably, the beam path includes at least one beam path splitter, which splits the light emitted by the light source of the illumination device into at least two separate partial beams and directs the at least two partial beams to different workpieces, for generating at least two shadow images of the different workpieces. This reduces the apparatus requirements, and the system is particularly suitable for inspecting workpieces that are close to one another, i.e., generally arranged close to one other on the holder. Concerning the design, reference is made to the description regarding the beam splitter outlined above.

Preferably, the partial beam paths of the inspection system are configured according to claim 8, as generally described within the scope of the invention regarding the beam path. The optical elements of at least two or all of the partial beam paths thus preferably comprise at least one or more plane mirrors, preferably all of the optical elements of the respective partial beam path are plane mirrors, which is preferably the case for all of the partial beam paths generated by an illumination device. This makes it possible to generate and detect the shadow image(s) of the respective workpiece with particularly low distortion or at least substantially free of distortion.

In particular, from the irradiation of the workpiece with different partial beams from different directions, also the concentricity of the inspected workpiece region, especially the free end of it, can be determined by means of the shadow images generated in this manner and can especially be computed by means of the evaluation device configured accordingly. The partial beams aligned to the workpiece and enclosing an angle with each other are preferably arranged in a plane perpendicular to the longitudinal axis of the workpiece.

Preferably, a light deflecting device of the optical system is provided in the beam path between the light source and the workpiece in the light emitted onto the workpiece at least substantially perpendicularly or perpendicularly to the longitudinal axis of the workpiece, i.e., preferably in a plane perpendicular to the longitudinal axis of the workpiece. In this case, it is provided with respect to (i) the irradiation direction of the light in the plane at least substantially perpendicular to the longitudinal axis of the workpiece in the direction of the workpiece and/or (ii) in the direction of movement of the holding device through the optical system that at least a first part of the light deflecting device is arranged in front of the workpiece and a second part of the light deflecting device is arranged behind the workpiece with respect to the said irradiation direction or movement direction of the holding device, the two parts of the light deflecting device each generating a shadow image of the workpiece. The irradiation direction of the workpiece preferably is the direction with which the light coupled or deflected directly into the plane perpendicular to the longitudinal axis of the workpiece irradiates towards the workpiece. Accordingly, a light deflecting device of the optical system, in which at least a first part of the light deflecting device is arranged in front of the workpiece and a second part of the light deflecting device is arranged behind the workpiece in the direction of radiation of the light onto the workpiece or in the direction of movement of the holding device, is preferably arranged in the direction of the beam path from the illumination device to the detection means in the beam path upstream of the workpiece, which beam path is arranged in a plane perpendicular to the workpiece longitudinal axis.

The described first and second parts of the light deflecting device may each be arranged immediately in front of the workpiece with respect to the beam path. The parts of the light deflecting device arranged in front of and behind the workpiece with respect to the direction of radiation onto the workpiece thus direct light beams for generating shadow images onto the workpiece in different directions, these light beams enclosing an angle to each other. This angle can for instance be 145° to 35°, preferably 60° to 120°, particularly preferably about 90°, without limitation thereto. This produces shadow images in different views of the workpiece and makes it possible to inspect the workpiece over a larger circumference of the same, the light from the above-mentioned light deflecting devices arranged in front of and behind the workpiece being preferably radiated in the direction perpendicular to the workpiece longitudinal axis towards the workpiece. In particular, the concentricity of the workpiece can also be determined from the shadow images of the various views, such as by means of the evaluation device. In this embodiment of the optical system of the inspection system, at least one part or several or all parts of the light deflecting device which is/are arranged in front of and/or behind the workpiece with respect to the direction of the beam path, is/are particularly preferably designed as a plane mirror, which enables a particularly low-distortion or at least substantially distortion-free imaging of the workpiece. The part of the light deflecting device designed as a plane mirror is preferably arranged in each case directly in front of or behind the workpiece with respect to the beam path. Preferably, two or more parts of the light deflecting device, preferably in the form of a plane mirror, which are arranged in front of the workpiece in the direction of the beam path, and two or more parts of the light deflecting device, preferably in the form of a plane mirror, which are arranged behind the workpiece in the direction of the beam path, are arranged in one plane. This plane is preferably arranged at least substantially perpendicular to the longitudinal axis of the workpiece; this plane can for example be set at an angle of ≤25° or ≤15°, particularly preferably ≤5° to the longitudinal axis of the workpiece; preferably this plane is arranged perpendicular to the longitudinal axis of the workpiece. Thus, a particularly favorable arrangement of the optical elements of the optical system is obtained in order to produce on the one hand a distortion-free shadow image of the workpiece, on the other hand a structurally particularly compact arrangement is obtained for being adapted for the inspection of a plurality of workpieces on a holding device in an inspection system. In particular, the said plane of the optical elements can be arranged at least substantially parallel or parallel to the main plane of a holding plate of the holding device, the workpieces being held on this holding plate during the inspection.

The illumination device and/or the optical detection means preferably are arranged outside the plane of optical elements which direct the illumination light for generating a shadow image directly onto the workpiece or are arranged directly behind the workpiece in the beam path direction and deflect or project the shadow image towards the optical detection means. Between the illumination device and/or the detection means, light deflecting devices are preferably arranged which are each designed as plane mirrors independently of each other or in combination with each other, whereby a distortion-free optical system for examination of the workpiece is provided.

In a generally independent sense and preferably generally within the scope of the invention, at least a part of the optical elements arranged in front of the workpiece in the direction of the beam path is preferably designed as a beam path splitter which splits the light beam of the illumination device into at least two partial beams, wherein a first partial beam is deflected or oriented towards a first workpiece and a second partial beam towards a second workpiece by means of the beam path splitter. The beam splitter is here preferably an optical element which directs the illumination light directly onto the workpiece for generating a shadow image of the workpiece. The first and/or the second partial beam can here be directed immediately onto the respective workpiece in order to generate a shadow image of the same. The two partial beams preferably lie in a plane which corresponds to the plane of the optical elements described above, which plane is arranged at least substantially perpendicularly or perpendicularly to the longitudinal axis of the workpiece. The beam path splitter is here preferably the optical element which is arranged in front of the respective workpiece in the direction of the beam path. Particularly preferably, the beam path splitter is a part of the light deflecting device described above, especially a part thereof arranged in front of the workpiece in the direction of radiation and/or in the direction of movement of the holding device of the workpieces through the optical system, the beam path splitter preferably being arranged directly in front of the workpiece in said beam path direction and/or direction of movement. With the equipment-related advantages of the beam path splitter, the optical system is also of particularly simple construction, with less effort for the adjustment of the optical elements and less possible optical imaging errors due to the multiple functions of the beam path splitter.

Preferably, the workpieces are arranged in several laterally spaced rows on the holding device. The at least two partial beams generated by the beam splitter, which are directed onto the workpiece to generate a shadow image, can here be directed onto at least two workpieces of the same row or onto workpieces of different rows of the row arrangement of the workpieces. Particularly preferably, the beam splitter generates exactly two partial beams which are directed to exactly two different workpieces.

Preferably, the beam splitter is formed by two or, where appropriate, more plane mirrors which are set at an angle to one another, preferably at an angle of 20° and/or ≤145°, preferably 30°, preferably ≤90° or ≤60°, particularly preferably about 45° or about 120°. The beam-splitting optical surfaces of the beam path splitter are preferably each designed as plane mirrors, whereby the optical surfaces can abut in an edge that preferably faces the illumination device. The beam path splitter can be arranged symmetrically in the beam path so that the illumination light incident on it is divided into two partial beams of equal illuminance or luminous intensity. The direction of incidence of the illumination light on the beam path splitter is preferably aligned with the bisector of the optical surfaces of the beam path splitter set at an angle to each other. If necessary, the beam path splitter can also generate more than two partial beams, preferably with mutually equal illuminance or luminous intensity.

Preferably, the optical system comprises a plurality of mirrors in the beam path located in front of the workpiece, which mirrors are arranged distributed around the circumference of the workpiece and each generate a shadow image of the workpiece. These mirrors are each preferably designed as plane mirrors, preferably all of the mirrors generating a shadow image of the workpiece. The mirrors generating a shadow image of the workpiece are here preferably arranged in the beam path direction directly in front of the workpiece, so that the light deflected by the mirrors or projected directly onto the workpiece generates the respective shadow image. The mirrors are here preferably spaced from one another in the circumferential direction of the workpiece, which is preferably arranged perpendicular to the longitudinal axis of the workpiece, in such a way that each mirror generates a shadow image that is spaced from an adjacent shadow image in the circumferential direction of the workpiece. The individual shadow images generated by the mirrors are thus separated from each other in the circumferential direction of the workpiece. However, the circumferential regions of the workpiece imaged on the adjacent shadow images can overlap with each other. Each of these shadow images is then deflected or projected onto the optical detection means by means of light deflecting devices arranged behind the workpiece in the beam path direction. In this manner, the detection means receives a plurality of separate shadow images of the respective workpiece, each shadow image corresponding to a circumferential section of the workpiece. This enables detailed inspection of the circumference of the workpiece with high precision. It is understood that the mirrors may be arranged in the circumferential direction of the workpiece in such a way that they reflect overlapping circumferential workpiece regions of the shadow images, preferably of the shadow images projected and detected adjacent to each other on the detection means. This allows a continuous circumferential region of the workpiece to be imaged on the detection means through a plurality of shadow images, allowing for a particularly accurate inspection of the workpiece. The plurality of mirrors can be arranged along an arc, for example a circular section around the workpiece, wherein the arc or circular section extends around the workpiece over 60° or 90°, preferably 120° or 145° or up to about 180° or possibly more, for example, in order to be able to image a large circumferential region of the workpiece on the detection means through several shadow images. Except for the track of the workpiece during its movement through the optical system, the mirrors can be arranged approximately in a semicircle around the workpiece, but also in other ways. In this case, 2, 3, 4 or more, for example 5, 6 or more mirrors, in particular plane mirrors, which direct light onto the given workpiece to create shadow images, may be provided.

Preferably, the optical system has a plurality of mirrors, preferably plane mirrors, in the beam path between the workpiece and the optical detection means, which mirrors are arranged distributed around the circumference of the workpiece, at least one or more of these mirrors, preferably exactly one, being assigned in each case to one of the plurality of mirrors generating a shadow image and supplying the shadow image generated by the respective mirror arranged in front of the workpiece in the beam path direction to the detection means. Thus, a plurality of shadow images, preferably a plurality of separate shadow images, are detected by the detection means. The mirrors generating a shadow image and the mirrors arranged behind the workpiece in the beam path each preferably surround the workpiece partially, so that in each case preferably at least two or more mirrors arranged distributed in the circumferential direction of the workpiece are provided, in each case preferably in the form of plane mirrors.

Preferably, a (first) plane mirror is provided on the illumination side of the workpiece, i.e., between the illumination device and the workpiece, which plane mirror directs or deflects light preferably emitted by the light source assigned to the workpiece for shadow image generation directly onto a plurality of mirrors, preferably plane mirrors, which are arranged distributed around the circumference of a workpiece and are preferably arranged directly in front of the workpiece in the beam path direction and generate a shadow image of the workpiece. This provides a particularly simple design of the optical system of the inspection system which, on the one hand, generates a low-distortion or essentially distortion-free image of the workpiece due to the arrangement of plane mirrors and wherein, on the other hand, a relatively large circumferential area of the workpiece can be inspected due to the plurality of mirrors which are arranged directly in front of the workpiece and each generate a shadow image. Furthermore, due to the (first) plane mirror arranged on the illumination side, several shadow images of the respective workpiece can be generated by means of preferably only one light source. For this purpose, the illumination device irradiates an area F1 of the first plane mirror which is equal to or larger than the sum of the illumination areas of the plurality of mirrors arranged directly around the workpiece, so that the plurality of shadow images can be generated by only one illumination device. The plurality of (second) mirrors generating a shadow image of the workpiece may be arranged in a plane at least substantially perpendicular or perpendicular to the longitudinal axis of the workpiece. The first plane mirror may be arranged outside this plane of the second mirrors. Alternatively or additionally, a plane mirror is provided on the detection means side of the workpiece which projects the shadow images from a plurality or all of the mirrors distributed around the circumference of a workpiece, each of which preferably receives a shadow image of the workpiece directly from the workpiece, the shadow images from said plurality of mirrors being projected towards the detection means. The plurality of mirrors are preferably arranged immediately behind the workpiece in the beam path direction. Each of this plurality of mirrors thus reflects a shadow image of the workpiece towards the plane mirror. The plane mirror thus preferably simultaneously detects several or all of these shadow images of the plurality of mirrors and preferably simultaneously projects them towards the detection means. This is conducive to achieving the lowest possible distortion or distortion-free projection of the shadow images towards the detection means.

Generally within the scope of the invention, when the inspection process of the respective workpiece is carried out, the aforementioned mirrors, beam path splitters and/or light deflecting devices are preferably arranged stationary relative to one another. This of course includes that the optical elements are preferably adjustable in their respective location in the beam path.

An inspection system according to the generic part of claim 1 or generally according to the present invention is provided by the invention in which, according to claim 17, the holding device comprises at least two rows of holders spaced apart from one another for at least one or exactly one workpiece in each case, wherein a light deflecting device is provided between the workpiece and the optical detection means, which in each case generates a shadow image of at least two workpieces of different rows of workpieces and directs it to the optical detection means, i.e., to one and the same detection means. The detection means, which in this case detects the shadow images of workpieces of several rows, is preferably a structural and/or functional unit, such as preferably exactly one camera or exactly one sensor. The detection means here preferably comprises exactly one lens, with the shadow images of the two or more different shadow images of different rows of workpieces falling into said lens. This provides for a particularly simple structural design of the inspection system, so that a plurality of workpieces can be inspected preferably simultaneously with little expenditure on equipment. Thus, only one detection means is required to inspect workpieces of several workpiece rows. This also makes the inspection system inexpensive to manufacture, since the acquisition means, such as a camera, entails considerable costs. Furthermore, this design is particularly compact, so that reliable inspection of the plurality of workpieces is possible even when they are arranged close to each other on the holding device.

Preferably, the detection means is designed to detect the shadow images of workpieces of different rows simultaneously. Preferably, the optical system together with the workpiece arrangement therein and the detection means are configured in such a way that several shadow images can be projected simultaneously onto the detection means and can be or are simultaneously detected by the detection means, which applies in particular to workpieces from different rows of workpieces.

The light deflecting device is preferably arranged between the rows of workpieces, preferably between adjacent rows of workpieces, particularly preferably at half the distance between the respective rows of workpieces. The light deflecting device can be arranged at the level of the workpieces with respect to a view perpendicular to the longitudinal axis of the workpiece. The same applies to a beam splitter, which can also be designed as a light deflection means.

Generally within the scope of the invention, the holding device for the workpieces is positionally variable with respect to the optical system of the inspection system. Preferably, the optical system, especially preferably all components thereof, is arranged stationary and the holding device is designed to be position-variable, in particular with translatory position change, especially preferably with a rectilinear movement. The holding device and thus also the rows of workpieces arranged thereon can thus be moved past the optical system or the deflection device with respect to the optical system and thus also with respect to the above-mentioned light deflection means and/or beam splitter between the rows of workpieces. In this manner, the holding device can be part of a transport device of the workpieces, which feeds the workpieces from the device forming the workpieces, such as in particular an injection molding machine, past the inspection system to further devices of a workpiece production line, such as for example a handling device for removing defective workpieces, a packaging machine or the like. The transport device can extend continuously along the entire length of the production line. The inspection system is thus preferably part of an automated workpiece production and/or packaging line. The individual devices are preferably part of a continuous workpiece production line, wherein the workpieces preferably arranged on a holding device and/or a carrier are transported directly from one device to the next within the production line, preferably without intermediate storage in a separate intermediate storage.

Furthermore, the object is achieved independently according to the invention or particularly preferably in combination with other embodiments of the inspection system according to the invention by an inspection system, in which the holding device has at least two rows of holders spaced apart from one another for in each case at least one or exactly one workpiece, wherein between the illumination device or light source and the workpiece a beam path splitter is provided which splits the illumination light and preferably directs it simultaneously to workpieces of different rows of workpieces. By means of only one light source, for example, at least two or optionally also more rows of workpieces can be inspected by means of the inspection system according to the invention. The light source for the various rows of workpieces is preferably a structural and/or functional unit. The light source may comprise exactly one illuminant. Preferably, the light source comprises exactly one optics or lens which preferably generates exactly one light beam. During the irradiation of two or more workpieces of different workpiece rows, the light source is preferably arranged stationary or unchanged in position relative to the optical system of the inspection system and/or relative to the detection means capturing the respective shadow images.

In this case, the beam path splitter is preferably arranged at the level of the workpieces when viewed perpendicular to the longitudinal axis of the workpiece, so that the workpieces or rows of workpieces are guided laterally past the beam path splitter when the position of the holding device is changed relative to the inspection system. This also provides a particularly compact design for the inspection system.

If the holding device has at least two or more rows of holders spaced apart from each other for at least one or exactly one workpiece per holder, then preferably the detection means and/or at least one light deflecting device, which directs light from the illumination device or from a light source towards different rows of workpieces, and/or a light deflecting device, which deflects light from the workpiece or the workpiece shadow image towards the detection means, is arranged between the rows of workpieces, preferably centrally between said rows of workpieces. This provides an optical system or inspection system as a whole which is compact and of particularly simple design and construction. At least two spaced-apart, preferably adjacent rows of workpieces can thus also be inspected by means of only one light source and/or only one detection means, which also reduces the equipment requirements. The same also applies to a preferred arrangement of a beam path splitter which splits the beam path from a light source and directs or projects the at least two partial beams onto different rows of workpieces.

Preferably, the respective light source of the illumination device is a point source. In this case, the point source preferably has a uniform light exit opening extending over a continuous surface, which emits the light of the light source towards the optical system. Over the extension of the point source, the illumination device preferably presents a constant light intensity. This includes that the extension of the point source is preferably at least equal to or greater than the workpiece diameter at the longitudinal section of the workpiece inspected by means of the inspection system. It is further preferred that the point source has a light exit surface whose width or diameter corresponds to the spacing of the rows of workpieces, the various rows of workpieces being illuminated by one and the same illumination device for generating shadow images of the respective workpiece. The distance between the rows of workpieces also includes the extension of the workpieces in their width on the side opposite to the respective adjacent row of workpieces. Said rows of workpieces are preferably arranged adjacent to each other. Said rows of workpieces are preferably rectilinear. It is generally understood that, when the workpieces are inspected by means of the inspection system, the holders of the holding device are each equipped with at least one or exactly one workpiece. Said point source is to be distinguished in particular from an annular light source, the central region of which does not emit light in the direction of the one or more workpieces to be inspected.

According to a first variant generally preferred within the scope of the invention, the optical axis of the light source associated with the respective workpiece and/or the optical axis of the detection means, preferably both optical axes, are aligned parallel to the longitudinal axis of the workpiece. This provides a structurally simple arrangement of the illumination device and/or the detection means, and a shadow image of the respective workpiece can be generated in a simple manner. Furthermore, the optical system can be easily adjusted. For simultaneous inspection of a plurality of workpieces supported on the holder, the light sources and detection means for inspecting a plurality of workpieces can be arranged in a common housing in a simple manner, for example arranged side by side. Preferably, the housing comprises all the light sources and detection means to be arranged for the inspection of the workpieces supported on a holding device, preferably in a plurality of rows of workpieces side by side.

According to a second variant generally preferred within the scope of the invention, the light source and detection means associated with the respective workpiece can be arranged in such a way that the beam path from the light source to the workpiece and, on the other hand, from the workpiece to the detection means, are aligned coaxially at least over a partial length of the beam path. The light source and the detection means can be spatially aligned to each other in such a way that the light emitted directly by the illumination device is arranged at least approximately perpendicular or perpendicular to the light beam entering the detection means. This provides a particularly compact design for certain applications.

According to the first and second variants, the embodiments may apply to all light sources and/or detection means of the inspection system. Generally within the scope of the invention, "associated with the workpiece" is to be understood as a light source which generates a shadow image of the respective workpiece.

Preferably, the optical system has an optical element which is designed to be partially transparent and which is arranged both in the beam path of the light or beam path emitted by the illumination device towards the workpiece and, at the same time, in the light falling from the workpiece towards the detection means. This optical element is preferably designed as a plane mirror. The optical element preferably is aligned obliquely to the beam path of the light incident from the illumination means and obliquely to the direction of the light beam directed from the workpiece toward the detection means, preferably in each case at an angle of approximately 45° to the respective light beam. The optical element thus exhibits, on the one hand, reflective properties with respect to the illumination light and, on the other hand, light transmission properties with respect to the light directed towards the detection means. For this purpose, said optical element may for instance have a suitable coating, such as common for example in partially transparent mirrors. The light incident on this optical element on the illumination side and the light passing through to the detection means can here fall on the same surface of the optical element. This allows a flexible arrangement of the illumination means to the inspection device, which is also designed to be compact and space-saving.

According to a preferred embodiment, the optical system is designed to irradiate the respective workpiece to be examined preferably simultaneously with at least two separate partial beams of at least one, preferably exactly one light source in order to generate a different shadow image of the respective workpiece with each partial beam. If the separate partial beams between the workpiece in its inspection position and the detection means, which is preferably the same detection means, such as a camera or a sensor, for the at least two partial beams, have a different beam path length and an optical element is preferably arranged in at least one of the beam paths of the partial beams between the workpiece and the detection means, the optical element adjusting the image sharpness of the different shadow images in the detection means to each other. This optical element is referred to here as the "adjustment element". The beam path length of the partial beam paths may be regarded as the geometric length thereof, if necessary. Due to the given depth of field of the optics or lens of the detection means, in particular a given focal length thereof, there is thus the problem that objects at different distances from the detection means may appear differently sharp. Preferably, the lens is focused on the workpiece with respect to one partial beam path, so that the shadow images of the one workpiece produced by other partial beams can appear out of focus. By means of the at least one optical adjustment element in the partial beam paths, the sharpness of the different shadow images is thus adapted to each other, so that preferably all shadow images appear sharp or equally sharp, regardless of the beam path length of the respective partial beam path, and the inspection of workpieces of different series can thus be performed with reliability. On the other hand, this enables shadow images of the given workpiece to be generated from different directions and the optical system and/or light source and/or detection means to be adapted in a variety of ways to special requirements such as geometry of the workpiece, spatial conditions at the inspection system or the like. Preferably, the optical adjustment element is arranged in a partial beam path which has a larger or the largest beam path length among the various partial beams that generate shadow images of the one workpiece. In the partial beam path with the shortest beam path length, such an optical element can preferably be omitted.

The adjustment element is preferably designed as a light-refracting optical element, such as in particular one or more prisms, one or more plane-optical elements such as planar plates with planar, mutually parallel light entry and light exit surfaces or combinations thereof. The partial beams preferably fall perpendicularly onto an optical surface of the optical element such as a light entry surface thereof. The partial beams preferably exit from the optical element perpendicular to the optical exit surface thereof. The partial beams preferably impinge on the optical adjustment element as a bundle of parallel light beams. The partial beams are preferably emitted or deflected as bundles of parallel light beams from the adjustment element towards the detection means. According to a preferred variant, the adjustment element is designed as a 60°-120° prism, preferably as a 90° prism. One or more adjustment elements, in particular each in the form of a prism, can be arranged directly in front of an optical deflection element, preferably in the form of a deflection mirror, of the optical system. The deflection element is preferably arranged at an angle to the longitudinal axis of the workpiece in its inspection position in order to deflect the beam path out of a plane which is at least substantially perpendicular to the longitudinal axis of the workpiece and to direct it to the detection means, which is preferably arranged outside this plane. This provides for a particularly compact structural design. The at least one adjustment element and the deflection means, in particular as a plane mirror, can be designed as a structural unit, which fact facilitates the assembly and adjustment of the optical system. The adjustment element may also extend only over a first part of the optical surface of the deflection element, wherein at least one other partial beam which represents a different shadow image of the one said workpiece falls on the other, i.e., second part of the optical surface of the deflection element and is deflected by the latter to the or to the same detection means.

If necessary, the adjustment element can also have at least one or more mirrors, for example also plane mirrors that can also be arranged directly one behind the other in the beam path direction. The design of the adjustment element as a light-refracting optical element is preferred because of its particularly compact design.

Preferably, the optical system does not comprise optical elements with convexly or concavely curved optical surfaces, such as lenses and/or concave mirrors with curved mirror surfaces. Preferably, the optical system does not have any light-diffracting optical elements. Any lens of the respective detection means and/or any lens of the respective light source are generally not considered to be part of the optical system.

According to one embodiment, preferably all optical elements of the optical system are plane mirrors, except for any optical elements adjusting the sharpness of the shadow images, in particular those for adjusting the sharpness of different shadow images of the same workpiece at different partial beams with different path lengths.

All optical elements of the optical system are preferably stationary with respect to the illumination device or light source and/or the detection means.

Generally within the scope of the invention, the inspection system can be designed in such a way that it inspects a plurality of sub-areas of the workpiece spaced apart from one another in the longitudinal direction of the workpiece. For this purpose, the respective workpiece can pass for example through two independent inspection systems arranged one behind the other in the transport direction of the holding device, each of which inspects different subsections of the workpiece. If the transport speed of the holding device is known, the shadow images generated in the two inspection systems can each be assigned to a specific workpiece so that its geometry or material defects can be inspected more precisely.

By detecting two different inspected sub-areas spaced apart from one another in the longitudinal direction of the workpiece, it is also possible for example to determine the concentricity of the workpiece or calculate it using the evaluation device. If necessary, the two inspection systems for inspecting different subsections spaced apart in the longitudinal direction of the workpiece can also be combined in one station, for which purpose, for example, a separate illumination device can also be provided for each area to be inspected in the longitudinal direction of the workpiece, the optical system being designed in such a way that the shadow images of the two workpiece sections spaced apart in the longitudinal direction of the workpiece are detected by means of the same detection means.

The invention further comprises an inspection method for inspecting elongated workpieces using an inspection system according to the invention. The description regarding the inspection method apply accordingly to the inspection system and vice versa.

According to a preferred embodiment of the inspection method, the holding device for holding at least one or a plurality of workpieces to be inspected is moved relative to the optical system in order to transport the respective workpiece to be inspected from a non-inspection position to an inspection position at the optical system generating the shadow image of the workpiece, wherein the exposure time of the workpiece for generating the at least one shadow image thereof is less than/equal to 1 millisecond, preferably ≤250 microseconds or ≤100 microseconds or ≤50 microseconds. This is made possible by the high contrast of the workpiece image in the form of a shadow image. The light source can be operated intermittently, i.e., clocked, or continuously to illuminate the workpiece. Generally, in electronic image capture and processing, the exposure time may be the period of time within which shadow images or corresponding image information are accumulated to produce the shadow image to be evaluated. The exposure time can correspond to the time duration of the workpiece in its inspection position or be shorter. The transport speed of the workpiece or holding device through the optical system may be ≥50 mm/sec or ≥100 mm/sec or ≥250 mm/sec, or possibly ≥500 mm/sec.

Figure 2B:
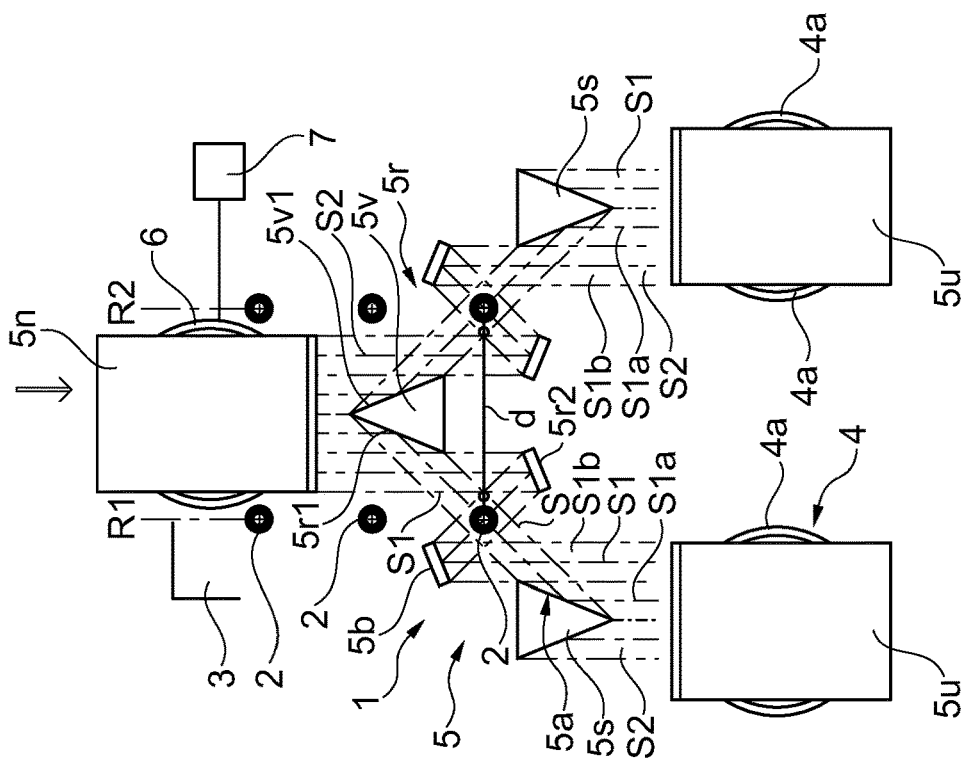
Figure 2A:
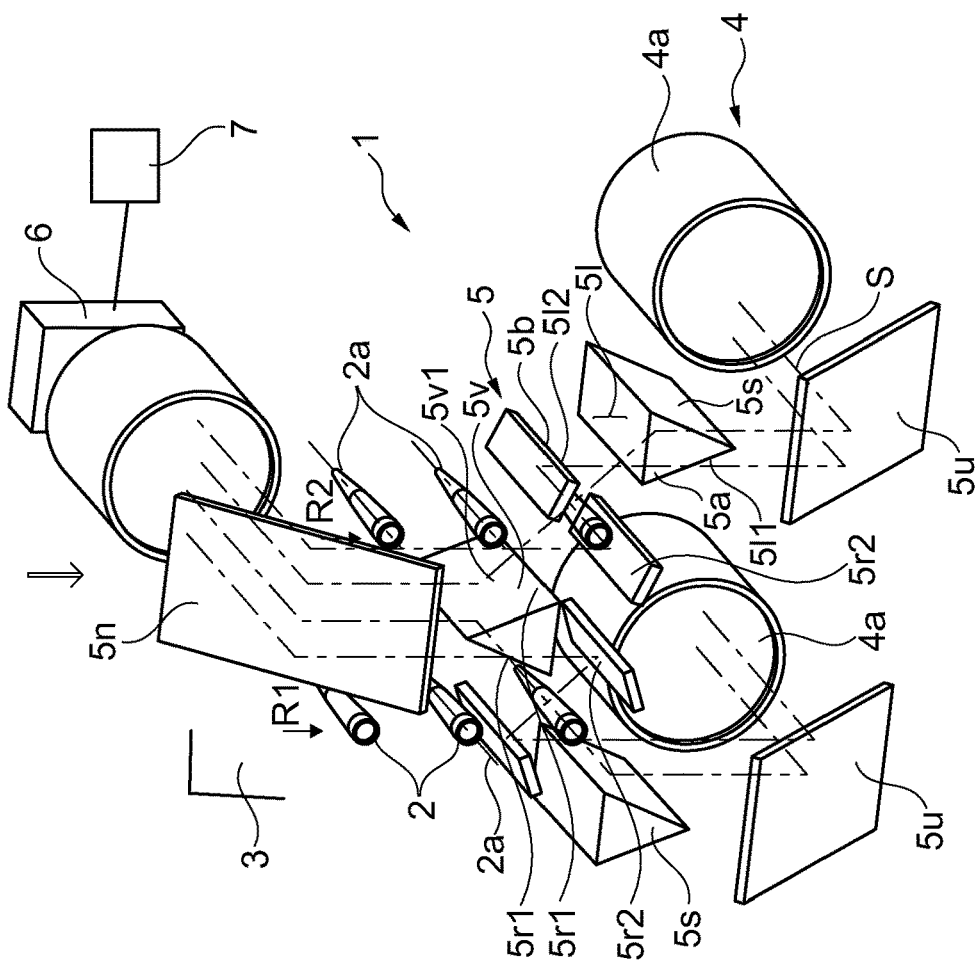
Figure 2C:
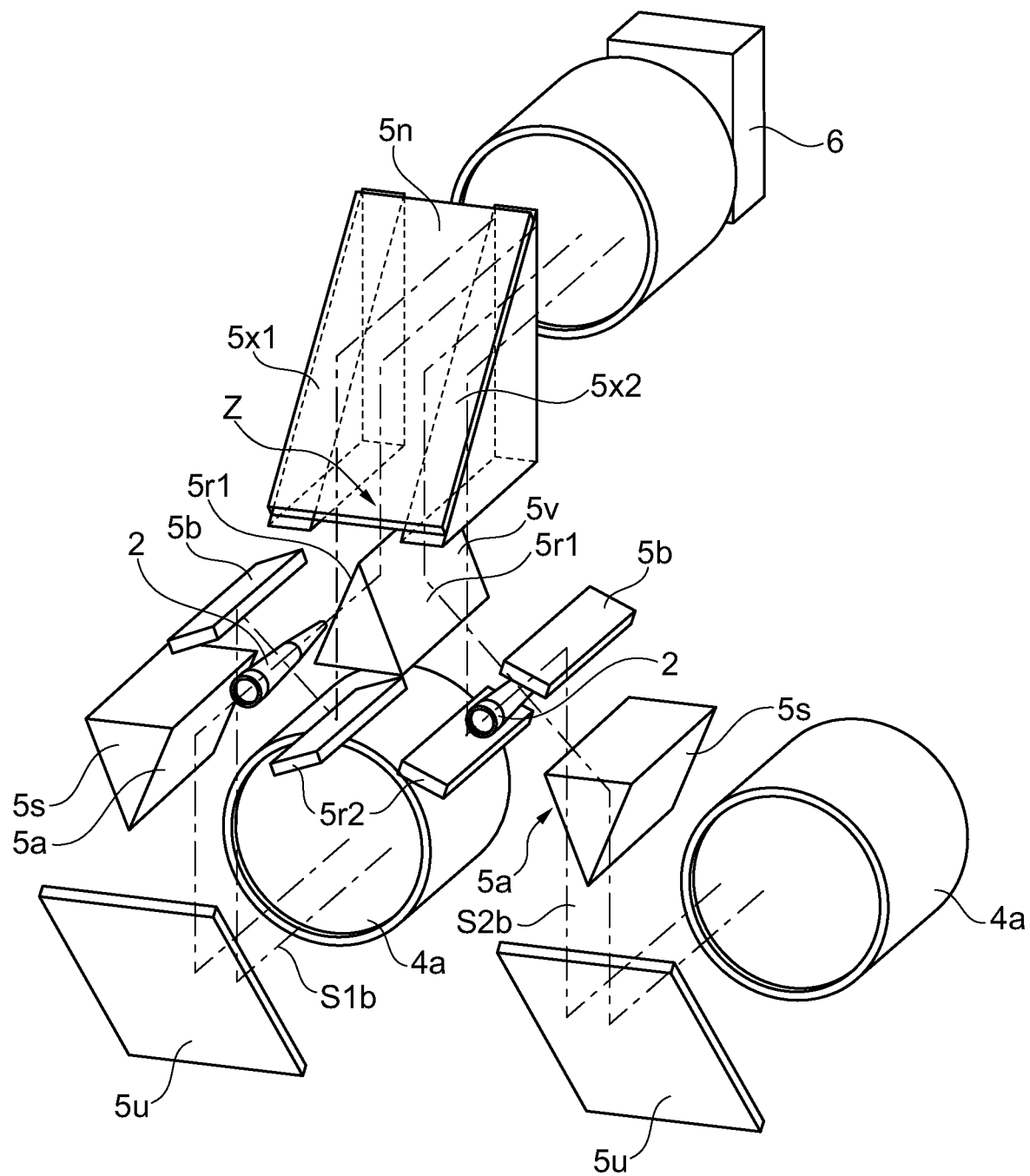
Figure 3:
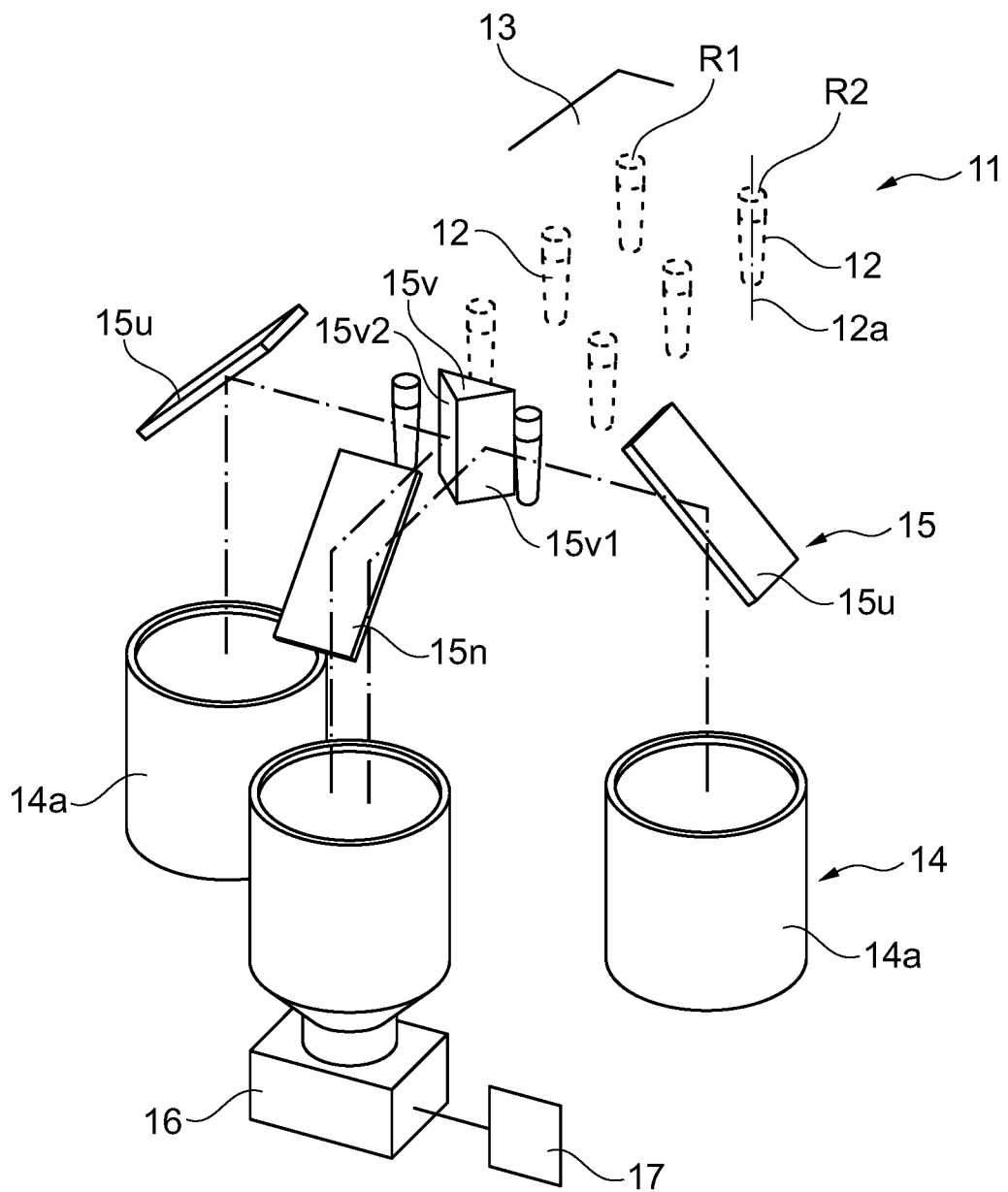
Figure 6:
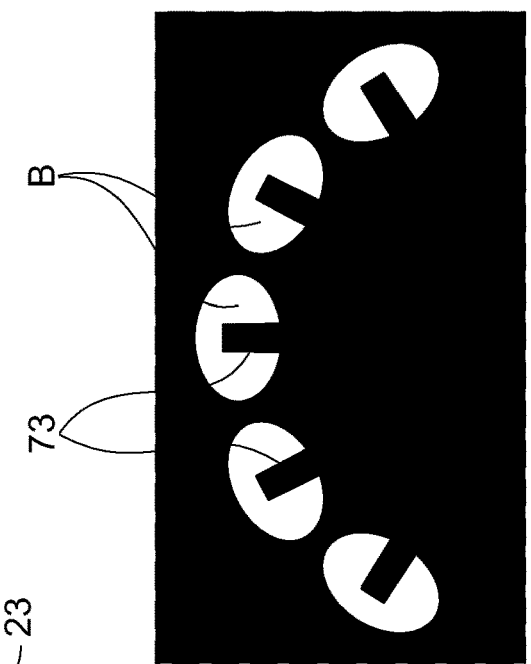
Figure 5:
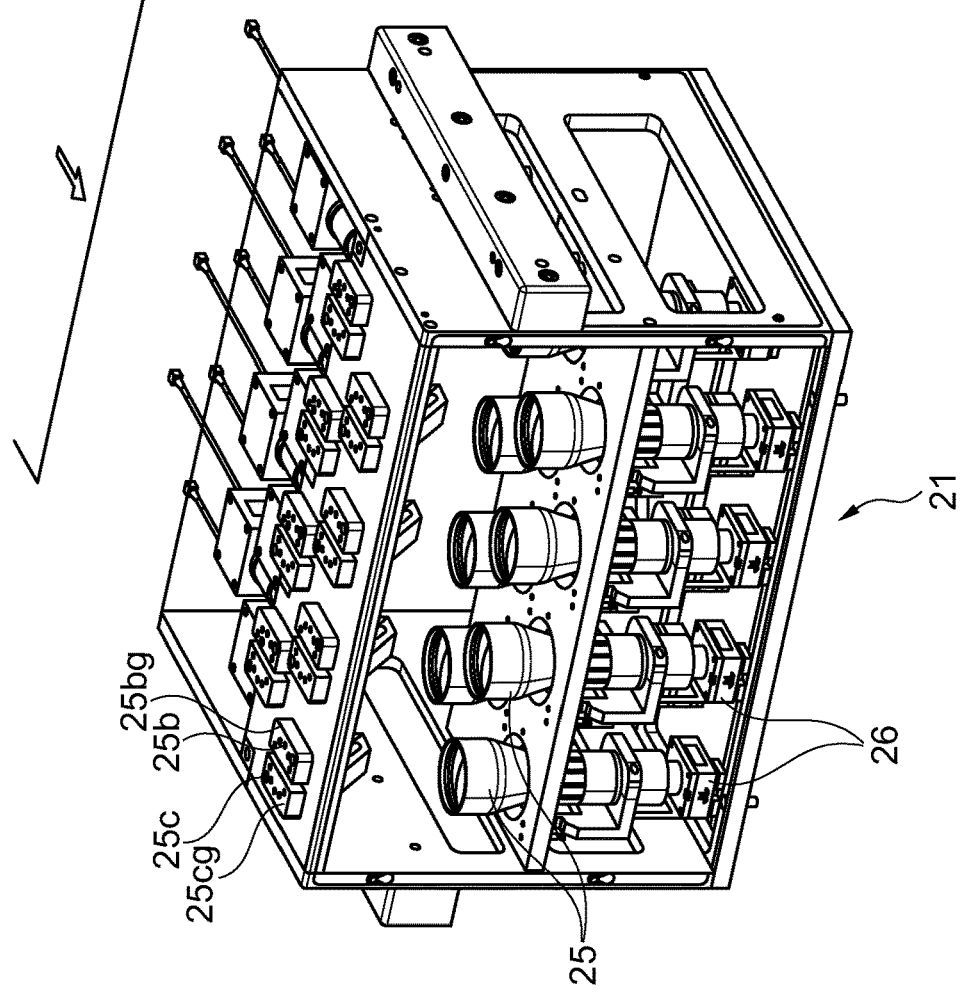
Figure 8A:
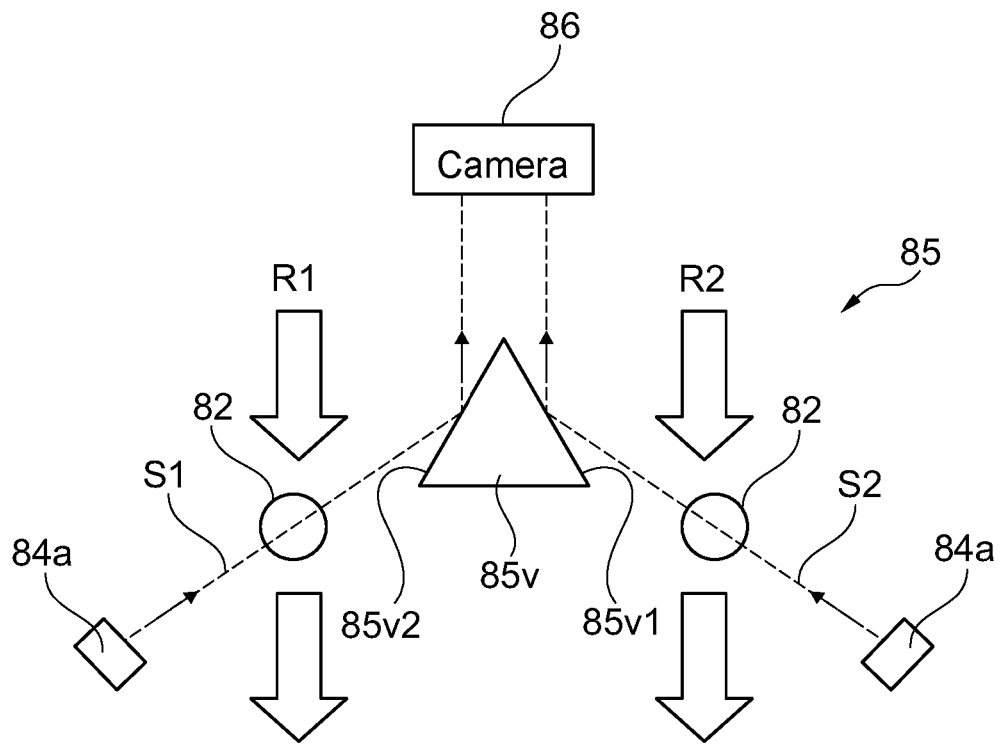
Figure 8B:
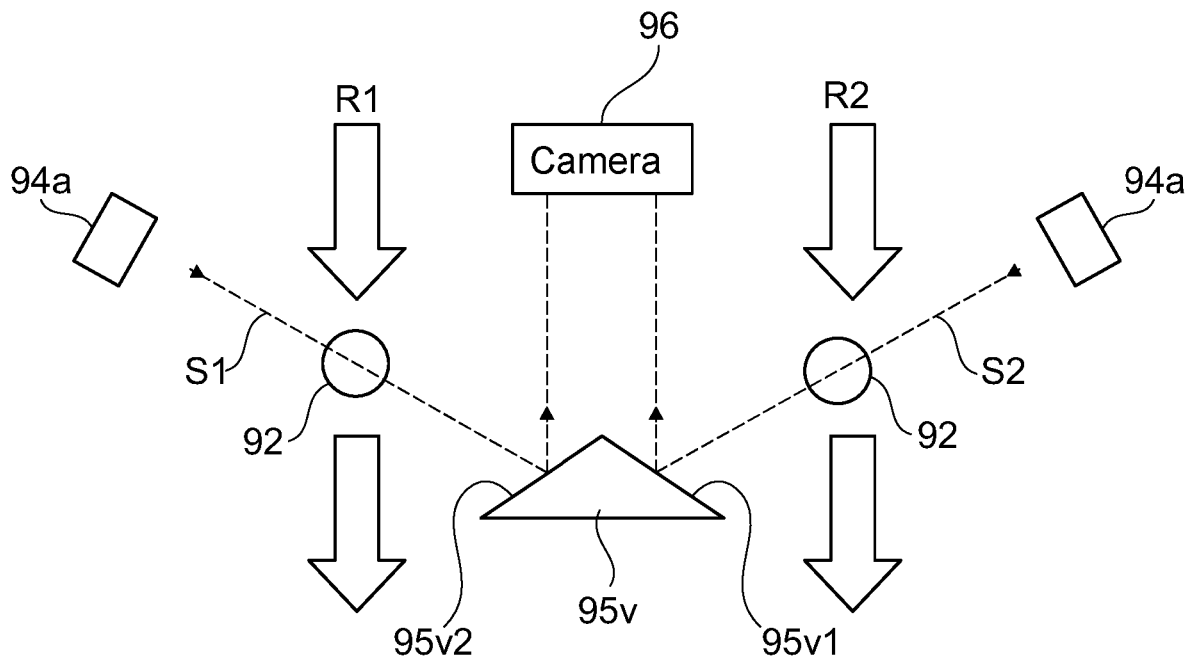

The invention will be described in more detail below with reference to several embodiments. It is understood that various features of the respective embodiment can also be combined with features of other embodiments. All features of the embodiments are independently disclosed generally within the scope of the invention. Identical components or features in the drawing figures are identified with identical reference numbers or with reference numbers increased by "10" or a multiple thereof. In the drawings it is shown by:

FIG. 1 a perspective view of a holding device of an inspection system according to the invention, FIG. 2 a perspective view of the optical system of a first inspection system according to the invention with illumination devices, the optical system and an optical detection means with workpieces in a perspective view (FIG. 2A) and a plan view (FIG. 2B) as well as in a modified embodiment (FIG. 2C);

FIG. 3 a second embodiment of the inspection system according to the invention with the illumination device, detection means and the optical system with several rows of workpieces;

FIG. 4 a third embodiment of the inspection system according to the invention with the illumination device, detection means and the optical system with several optical elements arranged distributed around the workpiece, as well as with workpieces (FIG. 4A), and with a simplified schematic representation of the beam path (FIG. 4B);

FIG. 5 a representation of the inspection system according to FIG. 4 with several optical systems arranged side by side and with detection means for inspecting several rows of workpieces;

FIG. 6 a representation of the several shadow images of a workpiece detected by a detection means of the inspection system according to FIG. 4;

FIG. 7 another alternative of the inspection system with the illumination device, the optical system and the detection means;

FIG. 7 another alternative of an inspection system with an optical system comprising a partially transparent optical element;

FIG. 8 schematic representations of the beam path of an inspection system according to the invention with a beam path splitter or light deflecting device according to a first embodiment (FIG. 8*a*) and a second embodiment (FIG. 8*b*).

FIGS. 1 to 5 and 7, 8 show embodiments of inspection systems according to the invention or parts thereof. FIGS. 2, 3, 4, and 7 show inspection systems with an arrangement of several workpieces arranged in rows of workpieces on the holding device. The respective holding device is not shown or is only indicated schematically; a holding device according to FIG. 1, for example, or another suitable holding device can be used.

FIG. 1 shows a perspective view of a holding device 3 for an inspection system 1 according to the invention, wherein this holding device 3 can be provided in all embodiments of the inspection system 1 or generally within the scope of the invention.

The holding device 3 has a plurality of holders 3*a*, wherein at least one workpiece 2 or in particular exactly one workpiece 2 is or can be held on each of the holders 3*a*. The workpiece 2 may for example be held on the respective holder 3*a* by negative pressure or by a mechanical device or in any other suitable manner. The plurality of workpieces is fixed here in a defined spatial position relative to one another on the holder, for which purpose the workpieces 2 are arranged here coaxially relative to one another with their workpiece longitudinal axes 2*a* (FIG. 2*a*). The workpieces 2 are each arranged on the holding device 3 at a distance from one another, namely in the longitudinal direction of the holding device or in the longitudinal direction of the rows R and transversely to this direction. The arrangement of the workpieces 2 on the holding device 3 may correspond to the arrangement of the workpieces as present in a molding device such as for example an injection molding machine having a plurality of cavities for simultaneously producing injection molded parts. The holding device 3 is position-variable with respect to the further devices of the inspection system such as, in particular, an illumination device 4, an optical system 5 and an optical detection means 6 (see, e.g., FIG. 2), so that the workpieces arranged on the holding device 3 are transported through the optical system 5 by changing the position of the holding device, in particular in a translatory movement, in particular a rectilinear translatory movement (direction of the arrow), in order to be able to inspect the workpieces 2 by means of the optical detection means 6, such as a camera, for workpiece defects. In this case, the holders 3*a* are arranged on a flat holding plate 3*b*. It is understood that the holding device generally can also be designed in other ways, in particular the plurality of workpieces 2 can be arranged in a different spatial arrangement relative to each other on the holding device. Here, the rows or tracks of workpieces are arranged in a straight line and aligned parallel to one another, but this is not necessarily required, for example, the workpieces 2 can also be arranged in a pattern on the holding device, preferably corresponding to the structure of the molding tool or the injection molding cavity of an injection molding machine. Eight rows of eight workpieces each are held on the holding device 3 in FIG. 1, without limitation thereto. The holding device 3 is transported in its longitudinal direction according to the direction of the arrow through the inspection system according to the invention which can be part of an automated production plant and thus also moved in its longitudinal direction through the optical system of the inspection system. If necessary, this can of course also be done in a direction transverse to the longitudinal extension of the holding device. The transport speed of the holding device 1 through the optical system of the inspection system may be in the range of 250 mm to 1000 mm/sec or more.

FIG. 2 shows a first embodiment of an inspection system 1 according to the invention for inspecting elongated workpieces 2, in particular injection-molded parts.

The inspection system 1 comprises a holding device 3 for holding at least one or a plurality of workpieces to be inspected, wherein the holding device can be designed as shown in FIG. 1. In this case, the workpieces may be arranged in a plurality of rows R separated from one another by a distance d (see FIG. 1), the rows preferably being of rectilinear design, as here, but the arrangement of the rows may generally also be different.

The inspection system 1 comprises an illumination device 4 with at least one light source 4*a*. If a plurality of rows of workpieces are provided, a plurality of light sources may also be provided to emit light onto the workpieces for inspection thereof, which workpieces may be of identical design. The light source is configured here as a point source, but may also be configured in other ways, wherein the respective light source can have a constant light intensity over its entire light emission area. The diameter of the light source 4*a* is here dimensioned in such a way that it irradiates the optical elements of the optical system 5 described below sufficiently and preferably with uniform light intensity relevant with respect to the workpiece inspection. According to the embodiment, the illumination device 4 comprises several light sources 4*a* which are arranged side by side here, but which can also have a different spatial arrangement or spacing from one another. Due to the particular design of the optical system 5, as described below, the number of light sources 4*a* is smaller in this case than the number of rows of workpieces on the holding device 3. More precisely, the light sources 4*a* are arranged here at half the distance between the rows R of workpieces, preferably between adjacent rows that have a greater distance d than other adjacent rows. On each of the rows bounding the array of workpieces, a further light source 4*a* is provided on the side facing away from the array of workpieces. Five light sources 4*a* are thus provided for the total of eight rows R of workpieces in a holding device 3 according to FIG. 1. It is understood that, if necessary, a separate light source 4*a* can also be assigned to each row of workpieces, depending on the design of the inspection system according to the invention. Furthermore, it is understood that the inspection system can also be used for inspecting only one workpiece or only two or more workpieces arranged adjacent each other.

Furthermore, the inspection system 1 comprises an optical system 5 for directing the light emitted from the light source 4a preferably laterally onto the workpiece 2 to be inspected, which is arranged on the holding device 3. As is generally the case within the scope of the invention, the emitted light respectively is preferably in the visible range (380-780 nm), without limitation thereto. Accordingly, the workpiece 2 to be inspected is in its inspection or measuring position on the inspection device, which applies to the workpiece covered by the beam path shown in FIG. 2 and in the other figures.

In this case, the light emitted from the respective light source 4a onto the workpiece 2 to be inspected falls onto the workpiece longitudinal axis 2a at an angle of 45° to 135°, preferably 60° to 120° or 75° to 105°, and at an angle of 90° according to the embodiment, in order to be able to inspect the workpiece 2 for perfect quality. The optical system 5 directs the light of the light source 4a onto the workpiece substantially or exactly perpendicular to the workpiece longitudinal axis 2a.

The optical system 5 is designed in such a way that it irradiates the workpiece 2 to generate its shadow image 73 (FIG. 6) and projects the shadow image onto the detection means. The light beams incident on the workpiece are aligned at least substantially parallel or parallel to each other. Here, the light source 4a or all light sources of the illumination device 4 emit light beams with at least substantially parallel or parallel light rays. The optical system 5 is designed such that the light rays of the workpiece shadow image impinge on the optical detection means 6 as beams of at least substantially parallel or parallel light rays. The optical system 5 is preferably designed such that the generated shadow image is at least substantially undistorted or undistorted and that the shadow image falls at least substantially undistorted or undistorted on the detection means. The exposure time of the workpiece may be less than 10 microseconds.

Further, an optical detection means 6 (commonly abbreviated as "detection means") is provided, wherein the workpiece 2 is arranged in the beam path S of the light emitted from the light source between the light source 4a and the optical detection means 6, and the optical detection means detects the image of the workpiece 2 generated by the illumination. The detection means 6 is configured here as a camera, but can also be configured as an image sensor or in another suitable manner, while cameras are particularly preferred for recording the respective shadow image in an undistorted manner and thereafter forward it to image processing.

Preferably, there is also provided an evaluation device 7 which is connected to the optical detection means 6 in a signal-transmitting manner. The evaluation device 7 is configured to enable or perform a comparison of the workpiece image detected by the optical detection means with a reference, for example a reference component. The corresponding evaluation can be performed by means of a computing device, for example, also by superimposing or comparing the captured workpiece image with the reference. The evaluation by means of the evaluation device can be computer-aided, for example using electronic image processing, or can be performed in another suitable manner. In the simplest case, the workpiece image is shown on a display of the optical detection means for inspection by a person.

In this case, the optical system 5 is particularly preferably designed in such a way that it generates an undistorted shadow image of the workpiece 2 from at least one direction transverse to the longitudinal axis of the workpiece and projects the generated shadow image undistorted onto the optical detection means. "Undistorted", also referred to as "distortion-free", in this case and also generally in the context of the invention comprises at least substantially distortion-free or distortion-free. By generating the undistorted shadow image, the workpiece can be inspected for perfect quality in a particularly reliable manner and with simple apparatus.

The optical system 5 comprises at least one plane mirror 5a which directs the light of the light source 4a or generally the light of the light source 4a assigned to the respective workpiece onto the workpiece 2; in this case two such plane mirrors 5a, 5b, in order to generate shadow images of the workpiece which are as undistorted as possible. With respect to the beam path from the light source 4a to the workpiece 2, the at least one plane mirror 5a, here both plane mirrors 5a, 5b, is/are arranged directly in front of the workpiece. It is understood that, if necessary, also more than two such plane mirrors can be provided, which direct light directly onto the workpiece for generating shadow images of the workpiece. The generated shadow image is at least substantially undistorted or undistorted compared to the workpiece. The light emitted by the plane mirrors 5a, 5b onto the workpiece 2 is redirected or projected onto the detection means 6 in the beam path direction downstream of the workpiece at least substantially undistorted or undistorted and is respectively detected by the detection means.

In the beam path on the illumination side, i.e., facing the illumination device with respect to the workpiece, a deflection mirror 5u configured as a plane mirror is provided in addition to the at least one plane mirror 5a, 5b, in the present embodiment the at least two or more plane mirrors 5a, 5b. In this case, one of the plane mirrors 5a, 5b can also be designed as a beam path splitter, as described below. In this case, the deflection mirror 5u directs the light from the light source 4a towards the workpiece, with the light emission direction of the light source 4a being arranged at an angle to the light which falls onto the workpiece to generate the shadow image. The light for generating the shadow image is directed onto the workpiece substantially or exactly perpendicular to the longitudinal axis 2a of the workpiece by means of the deflection mirror 5u. The light source 4a emits the light towards the workpiece 2 at an angle other than at least substantially perpendicular to the workpiece longitudinal axis 2a, in this case coaxially with the workpiece longitudinal axis. The deflection mirror 5u thus generally deflects the light emitted from the light source 4a into a plane which is arranged at least substantially perpendicular or perpendicular to the workpiece longitudinal axis 2a. In this case, the light is deflected by 90°, and the deflection mirror 5u is arranged at an angle of 45° to the longitudinal axis 2a of the workpiece for this purpose. By the arrangement of at least one or more plane mirrors arranged directly in front of the workpiece, in this case the plane mirror 5a, 5b, and the deflection mirror 5u configured as a plane mirror, a distortion-free shadow image of the workpiece is produced. In this case, the optical system 5 in the beam path between the illumination device and the workpiece 2 consists exclusively of plane mirrors.

Furthermore, the optical system 5 in the beam path between the workpiece 2 and the optical detection means 6 also comprises at least one or more plane mirrors which are disposed one behind the other in the beam path direction and which are exclusively plane mirrors in the present embodiment. In this case and generally within the scope of the invention, the feature "optical elements arranged one behind the other in the beam path" refers to the direction of propagation of the light.

The beam path S is telecentric on the lens side and/or on the image side. The illumination device thus has a telecentric light source which accordingly emits light onto the workpiece with mutually parallel beams. Several or all of the optical elements of the optical system 5 between the illumination device and the workpiece and between the workpiece 2 and the detection means 6 here provide true imaging, so that light beams incident in parallel are thus conveyed, in particular reflected as parallel light beams onto the detection means. Generally, light-refracting and/or light-diffracting optical elements, such as lenses, in particular lens arrangements with several lenses arranged one behind the other as an optical element and/or optical prisms and/or optical plates could also be used for this purpose. Preferably, no light-diffracting optical elements are provided. Light-refracting optical elements, in particular also, to the effective length of different partial beam paths. However, the use of plane mirrors is particularly advantageous because of their simple construction and inexpensiveness as components and their manufacturability with high optical quality for generating a distortion-free shadow image of the workpiece and project it onto the detection means.

At least one beam path splitter 5s is arranged in the beam path S between the illumination device or light source 4a and the detection means 6, more precisely in the beam path between the light source 4a and the workpiece 2. The beam path splitter 5s splits the light emitted by a light source 4a of the illumination device into at least two, in this case exactly two separate partial beams S1, S2 (FIG. 2b). The different partial beams S1, S2 can be directed onto different workpieces 2, in particular those of different rows R1, R2, preferably simultaneously or also offset in time, in order to generate shadow images of the workpieces. The rows R1, R2 are arranged here in a straight line, with a distance between them. The beam path splitter 5s is configured as a plane mirror or comprises a plurality of plane mirrors and, more precisely, is composed of such plane mirrors. The beam path splitter 5s is arranged directly in front of the workpiece in the beam path direction, so that the light directed immediately onto the workpiece by the beam path splitter 5s produces a shadow image. If necessary, also several such beam path splitters can be provided which, for example, direct different partial beams onto several workpieces 2. The partial beam paths S1, S2 and the optical elements arranged therein can be generally designed as described with respect to the beam path between the respective light source and the workpiece.

The beam path splitter 5s is arranged in this case stationary with respect to the light source 4a and the further optical elements of the optical system, while under certain circumstances also a movable beam path splitter can be used. This beam path splitter splits light from the light source 4a in different positions of its movement and deflects it towards different rows R, the workpieces of these rows being acted upon simultaneously or at different times by the respective light while producing a shadow image. This can generally apply within the scope of the invention.

The beam path splitter 5s or generally also a different optical element, preferably in the form of a plane mirror, is arranged in the light emitted by the light source 4a in such a way that a partial beam S1a of the light beam is blocked out and another partial beam S1b is transmitted to another optical element, preferably in the form of a plane mirror, both partial beams or also more, if necessary, being emitted onto the workpiece 2 for respectively producing a shadow image thereof. In this case, the beam path splitter at the same time provides the plane mirror 5a for the given workpiece 2.

The optical elements arranged in the beam path S between the light source 4a and the workpiece 2 are arranged here in such a way that the shadow images of the respective workpiece generated by a plurality of partial beams S1a, S1b are detected by the detection means 6 separately from each other and can preferably be evaluated separately by means of the evaluation device. The evaluation can take place in such a way that the workpiece can be inspected for concentricity. Reference is made to FIG. 6 in this respect.

In this case, the two partial beams S1a and S1b are directed onto the workpiece in a direction of approx. 90° to each other and impinge on the workpiece under this angle. The two partial beams S1a, S1b impinge on the workpiece 2 at least substantially perpendicularly or perpendicularly to the workpiece longitudinal axis 2a.

A light deflection device 51 of the optical system is provided in the direction of the beam path between the light source 4a and the workpiece 2, with a first part 511 of the light deflection device being disposed in front of the workpiece and a second part 512 of the light deflection device being arranged behind the workpiece with respect to the radiation direction of the light in the plane which is at least substantially perpendicular to the workpiece longitudinal axis. This arrangement of the parts 511, 512 of light deflecting device in front of and behind the workpiece 2 in this case also refers to the direction of movement of the holding device through the optical system corresponding to the direction of the arrow. In this case, the light deflecting devices 511 and 512 are arranged on different sides of a vertical of the straight row R of workpieces and are thus positioned in front of and behind the workpiece. This light deflecting device 51 is arranged in the light or beam of light emitted onto the workpiece at least substantially perpendicularly or perpendicularly to the workpiece longitudinal axis. Each of the two parts 511, 512 of the light deflecting device directs light directly onto the workpiece and generates a shadow image of the workpiece, in this case different shadow images from different directions to the workpiece. If necessary, more than two such light deflecting devices may be provided and/or the light deflecting device may comprise more than two parts, so that more than two shadow images of the one workpiece are generated. The respective shadow images of said one workpiece 2 are each projected separately from each other onto the optical detection means 6 and are detected separately by the optical detection means 6. The different shadow images of said one workpiece that are generated by means of the different parts of the light deflecting device 51 can be detected by the detection means 6 simultaneously or, if necessary, also offset in time. This can also generally apply within the scope of the invention. The beams oriented to the workpiece by the two parts of the light deflecting device 511, 512, which generate separate shadow images of the workpiece, together enclose an angle, preferably an angle of ≥30° and/or ≤145°, preferably ≥60° and/or ≤120°, preferably approx. 90°. Concerning the design of the light deflecting device and the layout of the beam path, reference is made to the above description regarding the beam path splitter. In this case, the light deflecting devices 511 and 512 are designed as plane mirrors. The light deflecting device 511 is at the same time part of the beam path splitter 5s, but this is not mandatory. In this case, the light deflecting device 512 is not simultaneously part of a beam path splitter, but can be so alternatively or additionally if necessary. By the arrangement of the light deflecting devices 511 and 512, which are respectively disposed in front of and behind the workpiece with respect to the aforementioned radiation direction and/or movement direction of the holding device 3, the front side facing the light source and the rear side of the workpiece facing away from the light source can thus be inspected by generating shadow images. According to the embodiment, the light deflecting devices 511, 512 or, if applicable, all of the light deflecting devices which are provided and which direct the light immediately onto the workpiece for generating the shadow image, are also designed as plane mirrors.

An angle of ≥30° and/or ≤175°, preferably ≥145° and ≤35°, preferably ≥60° and ≤120°, in this case about 90°, is provided between the beams falling from at least two parts of the light deflecting devices 51, in this case of the parts 511, 512, onto the workpiece. In this case, the vertical arranged to the row of workpieces represents at least approximately an angle bisector of said angle of the beams which are immediately directed onto the workpiece by the parts 511, 512 of the light deflecting device.

Each of the parts 511, 512 of the light deflecting devices 51, where appropriate also in the form of a beam path splitter 5s or generally in the form of an optical element 5a,b, in the present embodiment in the form of a plane mirror, which optical element emits light from the light source 4a directly onto the workpiece for generating a shadow image of said workpiece, is assigned a corresponding part 5r1, 5r2 of a light deflecting device 5r in the direction of the beam path between the workpiece and the optical detection means 6. This generally applies regardless of the arrangement of the parts of the light deflecting device 51, i.e., their arrangement in front of or behind the workpiece, for example. Thus, all parts of the light deflecting device 51 can also be arranged in front of or behind the workpiece. As a result, the shadow image generated by the respective light source-side part 511 of the light deflecting device 51 is imaged onto the light deflecting device 5r1 and deflected or projected towards the detection means 6 by the light deflecting device 5r1. The shadow image generated by the light deflecting device part 512 is deflected or projected onto the optical detection means via the corresponding light deflecting device part 5r2. The parts 511 and 512 and the parts 5r1 and 5r2 are formed as separate parts in this case. The parts 5r1, 5r2 are each formed as plane mirrors. Thus, different shadow images of one and the same workpiece, in this case from different views or radiation directions of the said workpiece, are supplied to the optical detection means 6.

The light deflecting device 5r1 is part of an optical element 5v which comprises two plane mirrors set at an angle to each other, i.e., comprises one more plane mirror 5v1 in addition to the plane mirror 5r1. The construction of the light deflecting device 5v in this case corresponds to that of a beam path splitter 5s, so that reference is made to the relevant description thereof. However, the edge of the light deflecting device 5v in which the plane mirrors 5r1, 5v1 converge or abut faces the detection means 6. In this case, the optical element 5v directs the light rays from workpieces of different workpiece rows R1, R2 to said one common detection means 6. This takes place by means of the light deflecting device 5n described below. Thus, the optical element 5v together with its at least two or exactly two sub-elements 5r1, 5v1 is disposed in the beam path between at least one light source, in this case two light sources, and two workpieces, preferably workpieces of different rows, and one—common—detection means 6 which detects the shadow images of the at least two workpieces of different rows R1, R2 and preferably supplies them to the evaluation device 7 in a signal-transmitting manner. Accordingly, the optical element 5v combines the shadow images of different workpieces 2 of different rows R1, R2. Here, the detection means detects the shadow images of the workpieces 2, 2' of different rows R1, R2 at the same time, since the workpieces 2, 2' are arranged at the same level with respect to their passage through the optical system or on the holding device 3. If the workpieces 2, 2' are arranged at different levels with respect to their passage through the optical system or on the holding device 3, i.e., if they are not arranged one behind the other but offset from each other when viewed from the side, the detection means detects the workpieces 2, 2' of different rows R1, R2 at different times, however, with nothing changing in the beam path with respect to the respective workpiece.

Furthermore, a light deflecting device 5n is provided in order to deflect the shadow images generated of the respective workpiece towards the optical detection means 6, namely a camera in this case. The deflection takes place through reflection. In this case, the direction of light incidence into the detection means 6 is at an angle, in this case perpendicular, to the plane E in which the shadow images are generated. In this case, the light deflecting device 5n is also arranged at 45° to the plane E and/or to the direction of light incidence into the optical detection means 6. The light deflecting device 5n is designed here as a plane mirror. The light deflecting device 5n directs several or all of the partial beams S1a, S1b which correspond to individual shadow images of the one workpiece onto the detection means 6. The detection means 6 is arranged outside plane E perpendicular to the workpiece longitudinal axis. However, generally within the scope of the invention, a plurality of light deflecting devices 5n may be provided, if necessary, in order to direct the plurality of shadow images of a workpiece onto the detection means. This may also generally apply within the scope of the invention.

The light deflecting device 5n directs partial beams S1, S2 from different workpieces 2, which are arranged in different rows R1, R2, onto the detection means 6. This may apply independently of or in addition to the deflection of the different partial beams S1a, S1b with respect to a specific workpiece, and additionally applies in the present case and may also apply generally within the scope of the invention.

The optical elements 511, 512, 5s, which emit light directly onto the workpiece for generating at least one or more shadow images of the workpiece, are arranged in such a way that the light and thus also the shadow image is generated of a central workpiece section referred to the workpiece longitudinal direction. But if necessary, the shadow image can for instance also be generated alternatively or additionally of the free end region of the workpiece which is opposite the workpiece holder, such as a pipette tip opening, vessel bottom or the like.

In the inspection system according to FIG. 2, the workpieces 2 are arranged in laterally spaced rows R1, R2. In this case, the holding device 3 is formed for instance as shown in FIG. 1 or in another suitable manner. Among the several rows of workpieces of the holding device, namely eight such rows in FIG. 1, only two such rows are shown in FIG. 2. In this case, the holding device 3 is variable in position relative to the optical system 5, in particular translationally variable in position, so that when the holding device is displaced relative to the optical system 5, the workpieces are passed through the optical system 5 along the longitudinal extension of the rows R. The holding device can be moved continuously so that the workpieces pass through the optical system continuously; if necessary, a gradual movement of the holding device is also possible. As a result, the workpieces of the respective row R successively enter the inspection area of the optical system 5, as illustrated for the two rows which are shown in FIG. 2 for a respective workpiece (with corresponding beam path). In the illustrated inspection position of the workpiece, the partial beams S1a, S1b of the light deflecting devices 511, 512 intersect. However, it is understood that—also generally within the scope of the invention—the respective workpiece can also pass through inspection or measuring positions spaced apart from one another in the direction of movement of the holding device, with shadow images being generated from different directions and/or of different longitudinal sections of one and the same workpiece in the spaced-apart inspection positions, which shadow images can be evaluated individually or together in the evaluation device 7. The respective light source 4a assigned to a workpiece or a row of workpieces for generating shadow images of the respective workpiece is arranged in this case between adjacent rows R1, R2, preferably centrally between them. This also applies to the beam path splitter 5s and the light deflecting device 5n and to the light deflecting devices 5r1, 5r1, 5v and the detection means 6 on the opposite side of the given workpiece or row of workpieces. Accordingly, in order to be able to detect also the rows of workpieces laterally bounding the array of workpieces, two additional light sources 4a with associated beam path splitters 5s are provided at the lateral boundaries of the array, so that only five light sources 4a with associated beam path splitters 5s are provided for the eight rows of workpieces. Furthermore, in the described arrangement of the holding device 3 with more than two or more than 3 spaced-apart rows of holders for at least one or exactly one workpiece in each case, a light deflecting device 5n is provided between the workpiece and the detection means 6, which light deflecting device aligns the shadow images of two workpieces of different workpiece rows R with a detection means 6. The shadow images of the two workpieces of the different rows can be detected here preferably simultaneously or also one after the other by a detection means, particularly in a case where the workpieces of different rows pass the inspection position of the optical system at different time, in order to the shadow image(s) of the respective workpiece. This means that for two rows of workpieces R, in this case two adjacent rows of workpieces R1, R2, only one optical detection means 6 is required, which is particularly cost-effective and saves installation space, especially when the rows of workpieces are close to each other. For the eight rows of workpieces in a holder according to FIG. 1, only four optical detection means 6 such as cameras are required. It is understood that the beam path shown in the figure of the exemplary embodiment can also be reversed—as in the other exemplary embodiments—so that four light sources 4a and five detection means 6 could be used here—but this is less advantageous in view of the higher costs of the detection means compared to the light source.

The light sources 4a of the illumination device are each designed as a point source with uniform light intensity over its entire radiation surface. The diameter of the light source is dimensioned such that it irradiates the beam path splitter 5s or, correspondingly, a first light deflecting device 511 and a second light deflecting device 512 in each case, in order to generate corresponding shadow images. Here, the light sources emit light bundles with light rays which are parallel to each other.

FIG. 2c shows a modification of the inspection system according to FIGS. 2a, b; otherwise, reference is made to the relevant description.

The optical system is designed in such a way that in this case the respective workpiece 2 to be inspected is irradiated simultaneously with two separate partial beams S1a, S1b of a light source 4, in order to generate a different shadow image of the respective workpiece with each partial beam S1a, S1b. The separate partial beams S1a, S1b for the same workpiece are detected by a common detection means 6. The separate partial beams S1a, S1b between the workpiece in its inspection position, as shown in FIG. 2b, and the detection means 6 respectively have a different beam path length between the workpiece 2 and the detecting means 6, so in this section, the beam path of the partial beam S1b is longer than the partial beam S1a. If the difference in the partial beam length is larger, as in FIG. 2c, the two shadow images could appear with different sharpness for a given depth of field of the lens of the detection means. In one of the beam paths of the partial beams S1a, S1b between the workpiece and the detection means, here in the longer partial beam S1b, an optical element 5x1 (dashed) is therefore arranged here as an adjustment element which adjusts the image sharpness of the different shadow images in the detection means to each other or corrects them to the same sharpness. The optical element 5x1 is designed here as a prism. The partial beam S1b falls perpendicularly onto the light entry area of the prism and leaves the prism perpendicularly to the light exit area thereof. In this case, the prism is a 90° prism, and the light entry and light exit areas are perpendicular to each other. Generally preferably, the optical element 5x1 is directly arranged on or for instance permanently fixed to the light deflection element, in this case the plane mirror 5n, without gap. No such adjustment element is arranged in the partial beam path S1a (not shown in FIG. 2c), although in general, if the adjustment elements are suitably designed, adjustment elements may also be provided in all partial beam paths for the said one workpiece where appropriate. Since two light beams S1, S2 from 2 different workpieces of different rows, which in this case originate from two different light sources, fall onto the light deflection element 5n, a second optical adjustment element 5x2 is also provided for the partial beam path S2b which is longer than the partial beam path S1a. The adjustment elements 5x1 and 5x2 are of identical design for the given beam path geometry, but this is not mandatory. In this case, the two adjustment elements 5x1, 5x2 are arranged at the two edge regions of the deflection device or plane mirror 5n. The shorter partial beams S1a, S2a fall directly onto the deflection element 5n in the intermediate space Z between them. The light radiated towards the detection means 6 by means of the light deflecting devices or plane mirrors 5r2 thus falls on the respective adjustment element 5x, while the light radiated towards the detection means 6 by means of the light deflecting devices or plane mirrors 5r1 falls into the intermediate space Z and thus directly onto the deflection mirror 5n.

FIG. 3 shows an alternative embodiment of the inspection system according to the invention. The differences to the embodiment according to FIG. 2 are described in the following. Otherwise, reference is made to the above description of the embodiment according to FIG. 2. Components of the inspection system according to FIG. 3 which correspond to components of the embodiment according to FIG. 2 are each identified with a reference number increased by "10". The inspection system according to FIG. 3 is particularly adapted to inspect workpieces in the form of reaction vessels such as sample containers which have a closed bottom and possibly a relatively large width.

In the inspection system 11 according to FIG. 3, each workpiece 12 or each row R of workpieces is assigned its own light source 14*a* of the illumination device 14. The light emitted by the light source 14*a* is thus projected onto only one workpiece, in order to produce a shadow image thereof. This allows the shadow image to have a relatively large width, and the light beam from the one light source 14*a* can in this case irradiate the entire diameter of the workpiece. In this case, the light beams incident on the workpiece 12 from the light source 14*a* also fall on the workpiece 12 at least substantially perpendicularly or perpendicularly to the longitudinal axis 12*a* of the workpiece. The light beams incident on the workpiece 12 are arranged such that a central section of the workpiece 12 is illuminated to produce a shadow image and, if necessary, the free end or alternatively the bottom area of the workpiece can be illuminated here additionally or alternatively, in order to generate a shadow image, for which purpose the light beam can for instance have a corresponding width, so that the shadow image also includes the bottom area. The "free end" of the workpiece is understood in this case—and also generally within the scope of the invention—to be the workpiece end which is arranged facing away from the holding device 13. Where appropriate, however, in the inspection system according to FIG. 3, the light emitted from a light source 14*a* can also be directed to a beam path splitter which generates at least two or more partial beams which are each directed onto different workpieces or onto one workpiece from different directions.

Here, the optical system 15 has a light deflecting device 15*u* which is configured as a plane mirror and which directs the light emitted from the light source 14*a* onto the workpiece 12 to produce a shadow image thereof. Furthermore, a light deflecting device 15*n* is provided behind the workpiece 12, i.e., on the side of the workpiece 12 facing away from the light source 14*a*, which light deflecting device deflects the shadow image directly generated towards an optical detection means 16, such as e.g., a camera. The light deflected by the light deflecting device 15*u* is here emitted in a direction which is arranged in one plane with the light beam impinging directly on the workpiece, this plane E being arranged at least substantially perpendicular or perpendicular to the longitudinal axis 12*a* of the workpiece. By means of a further light deflecting device 15*n*, here in the form of a plane mirror, the shadow image is then deflected or projected towards the detection means 6. By means of said one light deflecting device or plane mirror 15*n*, shadow images of workpieces of adjacent rows R1, R2 are deflected and projected onto a common detection means. The light deflecting device 15*n* decouples the light falling into it from the plane which is at least substantially perpendicular or perpendicular to the longitudinal axis of the workpiece towards the detection means 16.

The shadow images which are generated from the workpieces of different and in this case adjacent rows R1, R2 are projected, more precisely reflected, towards the detection means 16 or towards or onto the light deflecting device 15*n* by means of plane mirrors 15*v*1, 15*v*2 of the optical element 15*v*. Said one detection means 16 detects the shadow images of different rows of workpieces, in this case simultaneously or, if necessary, also offset in time, depending on the time of the presence of the two workpieces 12 in their inspection or measuring position in the beam path. The optical surfaces or plane mirrors 15*v*1, 15*v*2 in this case enclose an angle with each other, for example an obtuse angle, in this case an angle of about 90°. The plane mirrors 15*v*1, 15*v*2 converge towards an edge or, as shown, may abut at an edge. The light deflecting device 15*v* with the two optical surfaces 15*v*1, 15*v*2 can be designed here as an integral component; alternatively a separate light deflecting device can also be provided for one of the optical surfaces in each case. Reference is made to the corresponding description regarding the light deflecting device 5*v* according to FIG. 2.

The optical axes of the light sources 14*a*, i.e., in which this light is emitted, and/or the optical axis of the detection means 16, i.e., the direction in which light falls into the detection means, are in each case aligned parallel to the longitudinal axis 12*a* of the workpiece, where appropriate, independently of each other. However, at least one or both of the optical axes of the light source 14*a* and the optical detection means 16 may optionally be oriented in a different direction.

It is understood that also according to the embodiment of FIG. 3, a beam path splitter may be provided so that the light emitted from a light source may be directed in partial beams to at least or exactly two, preferably adjacent rows R of workpieces to generate shadow images of workpieces of these rows. For example, the light deflection mirror 15*u* can be arranged in the beam path of the light source 14*a* so that it deflects only half the light beam of the source 14*a* towards one row of workpieces, and next to it a further light deflection mirror is arranged at an angle of e.g., 90°, which deflects the other part of the emitted light beam towards another row R of workpieces.

FIG. 4 shows another embodiment of an inspection system 21 according to the invention. In the following, the differences to the embodiments of FIGS. 2 and 3 are described; in all other respects, reference is made to the description of these figures in full. Identical components as in the preceding embodiment are each identified with a reference number increased by "10".

The optical system 25 of the inspection system 21 here comprises a plurality of mirrors 25*b* which are arranged distributed around the circumference of the workpiece 22, the mirrors 25*b* being arranged particularly advantageously in an arcuate manner, more specifically along a circular arc section around the workpiece 22. Each of the mirrors 25*b* generates a shadow image of the workpiece, namely in accordance with the mirror arrangement, each from a different direction. Thus, in accordance with the different directions, a shadow image is generated by each mirror 25*b* from a different peripheral region of the workpiece. The plane of the circular arc section is arranged here at least substantially perpendicular or perpendicular to the longitudinal axis 22*a* of the workpiece. In this case, the optical system 25 is arranged to generate shadow images of a longitudinal section, here of the free end of the workpiece, for example of a pipette tip opening. The (circular) arc section on which the plurality of mirrors 25*b* are arranged in a distributed manner is here formed substantially as a semicircle. In this case, the mirrors 25*b* are each configured as plane mirrors.

The light emitted from the light source 24*a* is directed towards the plurality of mirrors 25*b* by a light deflecting device 25*a* configured as a plane mirror. The emission surface of the light source 4*a* and/or the light deflecting device 25*a*, in this case both, each have a surface for irradiating all of the mirrors 25*b* with a light bundle of parallel beams. Each of the mirrors 25*b* generates a shadow image of the workpiece 22, each from a different direction. A plurality of mirrors 25*c*, each of which is also configured as a plane mirror, is arranged behind the workpiece 22 in the beam path direction. Each of the mirrors 25*b* generating a shadow image is provided with a corresponding mirror 25c for projecting, in this case reflecting, the respective shadow image toward the detection means. In this case, the mirrors 25c are respectively arranged in the straight connecting line: mirror 25b—workpiece—mirror 25c. In this manner, a plurality of shadow images of the workpiece is generated from different directions, wherein the shadow images are separated from each other and detected separately, i.e., resolved from each other, by the detection means 26, respectively. The detection means 26 detects the different shadow images simultaneously, where appropriate, also staggered in time. The light emitted from the mirrors 25c towards the detection means 26 can in this case be emitted laterally past the light deflecting device 25a onto the detection means 26, if necessary, also through the deflection device 25a, which for this purpose can then be designed for instance as a semi-transparent mirror with both reflective and light-transmitting properties.

The optical axis of the light source 24a is arranged here at an angle and more precisely perpendicular to the longitudinal axis 22a of the workpiece, which creates a structurally compact embodiment that is particularly adapted for specific structural situations. If necessary, however, the optical axis of the light source 24a can also be oriented in another direction with respect to the longitudinal axis 22a of the workpiece by means of suitable light deflecting devices. The optical axis of the detection means 26 is arranged here parallel to the longitudinal axis 22a of the workpiece, but by means of light deflecting devices arranged in the beam path, a different orientation of this optical axis can also be given.

According to FIG. 4, a separate light source 24a and a separate detection means 26 are assigned to each row of workpieces. This makes it possible to irradiate the workpiece area to be inspected with high luminous intensity and enables particularly high precision in inspecting the workpiece. If necessary, however, the light emitted by the light source 24a can be supplied to a beam path splitter also in this embodiment, as basically shown in FIG. 2, so that different workpieces or workpieces of different rows can be inspected by means of one light source also in this case.

FIG. 5 shows the structure of the inspection system 21 corresponding to the embodiment shown in FIG. 4, with a plurality of optical detection means 26, each of which is assigned to one optical system 25 for inspecting a workpiece (the light sources 24a are not shown). The optical systems 25 for inspecting the workpieces of different rows of workpieces are arranged in this case offset from one another in the direction of movement of the holding device 23 (direction of the arrow), which permits a structurally compact design and adaptation of the system also to closely adjacent rows of workpieces. This design can also be implemented in all other embodiments or generally within the scope of the invention. In this case, the holding device 23 can be designed, for example, as shown in FIG. 1. The plurality or totality of arcuately arranged mirrors 25b at the respective workpiece inspection position are each arranged in a block or common housing 25bg. The same applies to the arrangement of the mirrors 25c in a common housing 25cg, which are assigned to the same workpiece as the mirrors 25b. This considerably simplifies the assembly of the mirrors, and the mirrors 25b or 25c can be adjusted with respect to each other in the housing. The housings 25bg and 25cg are spaced laterally from one another in this case, in order to leave a track on which the respective row of workpieces can be passed through the optical system by means of the holding device 23.

FIG. 6 shows a representation of the shadow images detected by the optical detection means 26 of the inspection system 21 according to FIG. 4. The individual shadow images B, five in this case, corresponding respectively to the number of mirrors of the arrays of mirrors 21b and 25c arranged on the light source side and the detection center side, are spatially separated from each other so that the respective shadow images are separated from each other and can be evaluated separately. The separate evaluation comprises that the individual evaluations of the shadow images can be related to each other, in order to be able to examine the workpiece for concentricity, for example. It is understood that the bright image regions of the different shadow images of the one workpiece can also overlap each other, as long as the different workpiece shadows, in particular of the free end of the workpiece, are sufficiently resolved separately from each other. The representation of a single one of the shadow images B in this case basically also corresponds to a shadow image as generated by the other embodiments of the inspection system or generally within the scope of the invention, taking into account the different workpiece section that is inspected and, if applicable, other specific features of the respective inspection system.

FIG. 7 shows another embodiment of an inspection system 31 according to the invention. In the following, the differences to the previously discussed inspection systems are described; in all other respects, reference is made to the description of these figures in full. Identical components are each identified with a reference number increased by "10".

The light emitted from the light source 34a is here emitted onto a light deflecting device 35a, wherein further light deflecting devices, optionally also a beam path splitter, can be arranged between the light source 34a and the light deflecting device 35a. The light deflecting device 35a is configured here as a plane mirror. The light deflecting device 35a is configured here as a semi-transparent mirror which thus has both reflective and light-transmitting properties. The optical system of the inspection device has at least one semi-transparent mirror, here the mirror 35a. The light emitted from the light source 34a is thus guided via the semi-transparent light deflecting device 35a towards the workpiece 32 to be inspected, in this case exemplarily by means of the said further light deflecting device 35b, into the plane at least substantially perpendicular to the longitudinal axis of the workpiece towards the workpiece, and thereafter exemplarily onto various workpieces 22 of different workpiece rows R1, R2 by means of a beam path splitter 35s. The beam path splitter 35s with two optical surfaces 35s1, 35s2 formed as plane mirrors can be constructed like the optical element 15v according to FIG. 3. It is understood that, in general, the angle between the two surfaces of the beam path splitter or optical element 15v depends on the respective arrangement of the beam path, so that this angle—generally within the scope of the invention—can be adapted for the respective situation. In this case, the optical axis of the light source 34a is arranged in the longitudinal direction of the workpiece rows R, but if light deflecting devices are suitably arranged, the optical axis can also be oriented differently, if necessary. It is understood that a modified embodiment of the inspection system can also be implemented without beam path splitters for instance, with a separate light source 34a being assigned to each row of workpieces. Generally within the scope of the invention, the plane mirrors of the optical system are not configured as partially transparent plane mirrors, and preferably each reflect the light beam incident thereon as fully as possible or fully in the exit direction of the respective mirror. This may apply to all mirrors of the optical system, except for the partially transparent plane mirror provided in a preferred embodiment.

FIG. 7a shows the beam path between the light source 34a and the detection means 36 only incompletely. The completed beam path is schematically shown in FIG. 7b. The light emitted from the optical surfaces 35s1, 35s2 onto the respective workpiece 32, which produces the respective shadow image of the workpiece of row R1 or R2, is reflected by the plane mirrors 35c1, 35c2 onto the light deflecting device 35b, and from this towards or onto the semi-transparent light deflecting device 35a and further onto the detecting means 36 that detects separate shadow images of the workpieces 32 of different rows. In this case, the beam path of the detecting means 36 is arranged parallel to the longitudinal axis 32a of the workpieces, but this is not mandatory when further light deflecting devices are interposed.

This arrangement of a semi-transparent light deflecting devices 25a can also be implemented in connection with all other embodiments or generally within the scope of the invention.

FIGS. 8a, 8b of FIG. 8 show two different configurations of optical elements 45 of an inspection system 41 according to the invention in part. These two configurations can also be implemented generally within the scope of the invention or in relation to the embodiments, so that the beam path can be adapted for the respective requirements.

FIG. 8a shows a detail of the beam path including a light deflecting device 85v of an optical system 85 corresponding to the light deflecting device 15v according to FIG. 2, which light deflecting device projects or deflects two different partial beams S1, S2 from two light sources 84a from workpieces of different rows R1, R2 onto a detection means 86 (camera), here a common detection means. The arrows in FIG. 8 indicate the direction of movement of the workpieces 82 when the holding device is moved through the optical system. The light deflecting device 85v has two optical surfaces 85v1, 85v2, which in this case are configured as plane mirrors which are set at an acute angle, in this case at an angle of about 35° to 55° to each other. Concerning the direction of movement of the workpieces (arrow), the light sources 84a are disposed behind the device 85v with regard to the connecting line: "detection means 86—light deflecting device 85v". The beams of the beam path enclose an obtuse angle. In all other respects, reference is made to the description of the beam path in context with FIG. 2.

According to FIG. 8b, the light deflecting device 95v is modified compared to the light deflecting device 85v. In this case, too, light with partial beams S1, S2 is directed from the two light sources 94a onto the respective workpiece 92, producing a shadow image of the same, and the shadow image is directed via the light deflecting device 95v onto the detection means 96. In this case, the light deflecting device 95v has two optical surfaces 95vi, 95v2, which are set at an obtuse angle, here approx. 115°. With respect to the direction of movement of the workpieces (arrow), the light sources 84a are disposed in front of the device 85v with regard to the connecting line: "detection means 96—light deflecting device 95v". The beams of the beam path enclose an acute angle. Where appropriate, in the embodiments of FIGS. 8a, 8b or generally within the scope of the invention, the angle between the two optical surfaces may also be approximately 90°.

Based on FIG. 8, it is understood that a corresponding geometry of the beam path can also be provided in the beam path between the respective light source and the workpiece. The beam paths according to FIGS. 8a, 8b can accordingly also apply to other light deflecting devices, e.g., for beam path splitters, e.g., the beam path splitter 5s according to FIG. 2. Furthermore, additional light deflecting devices can be provided corresponding to the arrangement of the light source and the detection means relative to the rows of workpieces.

The invention claimed is:

1. An inspection system for inspecting elongated workpieces, comprising:
    a holding device for holding a plurality of workpieces, wherein the holding device comprises at least two rows of holders spaced apart from each other, wherein each row of holders has several holders, and wherein each holder holds a workpiece of the plurality of workpieces, wherein the workpieces held by holders of one row of said rows are different from and spaced apart from the workpieces held by holders of another row of said rows;
    an illumination device comprising at least one light source;
    at least one optical detection means, wherein each workpiece to be inspected is arranged in a beam path of a light emitted from the at least one light source between the at least one light source and the at least one optical detection means;
    an optical system for directing the light emitted from the at least one light source onto each workpiece to be inspected, and from each workpiece to be inspected onto the at least one optical detection means, wherein the at least one light source and the optical system are configured to generate a shadow image of each workpiece to be inspected from at least one direction transverse to a longitudinal axis of each workpiece to be inspected and to project the generated shadow image of each workpiece to be inspected onto the at least one optical detection means, and wherein the at least one optical detection means detects the shadow image of each workpiece to be inspected generated by the illumination device; and
    an evaluation device which is connected to the at least one optical detection means in a signal-transmitting manner and enables evaluation of the shadow image of each workpiece to be inspected, and
    wherein the optical system comprises a light deflecting device provided between two of the workpieces of different rows of holders to be inspected and one of the at least one optical detection means, wherein the light deflecting device aligns the shadow images of said two workpieces of different rows of holders to said one of the at least one optical detection means.

2. The inspection system according to claim 1, wherein the optical system comprises at least one plane mirror which directs the light of the at least one light source onto each workpiece to be inspected.

3. The inspection system according to claim 1, wherein the optical system is configured in such a way that beams incident on each workpiece to be inspected and generating the shadow image of each workpiece to be inspected are a light bundle of beams aligned at least substantially parallel to each other.

4. The inspection system according to claim 1, wherein the beam path includes at least one beam path splitter which splits the light emitted from one of the at least one light source into at least two separate partial beams and directs the at least two partial beams onto one and the same workpiece to be inspected for generating at least two shadow images thereof.

5. The inspection system according to claim 1, wherein one of the at least one optical detection means is designed to simultaneously detect the shadow images of workpieces of different rows.

6. The inspection system according to claim 1, wherein one of the at least one optical detection means is arranged between the two rows.

7. The inspection system according to claim 1, wherein an optical axis of the at least one light source of the illumination device is aligned parallel to the longitudinal axis of each workpiece to be inspected.

8. The inspection system according to claim 1, wherein the optical system is configured to irradiate each workpiece to be inspected with at least two separate partial beams of the at least one light source in order to generate a different shadow image of the respective workpiece with each partial beam, wherein the separate partial beams have a different beam path length between the respective workpiece in its inspection position and the at least one optical detection means, and wherein an optical element is arranged in at least one of the beam paths of the partial beams between the respective workpiece and the at least one optical detection means in order to adjust an image sharpness of the different shadow images to one another in the at least one optical detection means.

9. The inspection system according to claim 1, wherein the optical system is configured to generate an undistorted shadow image of each workpiece to be inspected from at least one direction transverse to the longitudinal axis of said workpiece or to project the generated shadow image undistorted onto the at least one optical detection means.

10. The inspection system according to claim 1, wherein the light deflecting device provided between two of the workpieces of different rows of holders to be inspected and one of the at least one optical detection means is arranged between the two rows.

11. The inspection system according to claim 1, wherein an optical axis of the at least one optical detection means is aligned parallel to the longitudinal axis of each workpiece to be inspected.

12. The inspection system according to claim 1, wherein the optical detection means includes a camera.

13. The inspection system according to claim 1, wherein the optical detection means includes an image sensor.

14. An inspection system for inspecting elongated workpieces, comprising:
a holding device for holding a plurality of workpieces, wherein the holding device comprises at least two rows of holders spaced apart from each other, wherein each row of holders has several holders, and wherein each holder holds a workpiece of the plurality of workpieces, wherein the workpieces held by holders of one row of said rows are different from and spaced apart from the workpieces held by holders of another row of said rows;
an illumination device comprising at least one light source;
at least one optical detection means, wherein each workpiece to be inspected is arranged in a beam path of a light emitted from the at least one light source between the at least one light source and the at least one optical detection means;
an optical system for directing the light emitted from the at least one light source onto each workpiece to be inspected, and from each workpiece to be inspected onto the at least one optical detection means, wherein the at least one light source and the optical system are configured to generate a shadow image of each workpiece to be inspected from at least one direction transverse to a longitudinal axis of each workpiece to be inspected and to project the generated shadow image of each workpiece to be inspected onto the at least one optical detection means, and wherein the at least one optical detection means detects the shadow image of each workpiece to be inspected generated by the illumination device; and
an evaluation device which is connected to the at least one optical detection means in a signal-transmitting manner and enables evaluation of the shadow image of each workpiece to be inspected, and
wherein a beam path splitter is provided between one of the at least one light source and two workpieces of different rows of holders, which beam path splitter splits the beam path of said one of the at least one light source and aligns it simultaneously to the two workpieces of different rows of holders.

15. The inspection system according to claim 14, wherein the optical detection means includes a camera.

16. The inspection system according to claim 14, wherein the optical detection means includes an image sensor.

17. An inspection system for inspecting elongated workpieces, comprising:
a holding device for holding at least one workpiece to be inspected;
an illumination device comprising at least one light source;
at least one camera, wherein the at least one workpiece to be inspected is arranged in a beam path of a light emitted from the at least one light source between the at least one light source and the at least one camera,
an optical system for directing the light emitted from the at least one light source onto the at least one workpiece to be inspected, and from the at least one workpiece to be inspected onto the at least one camera; and
an evaluation device which is connected to the at least one camera and enables evaluation of the shadow image of the at least one workpiece to be inspected, and
wherein the optical system is configured to generate a shadow image of the at least one workpiece from at least one direction transverse to the longitudinal axis of the at least one workpiece and to project the generated shadow image onto the detection means, and
wherein the optical system is configured to irradiate the at least one workpiece to be inspected with at least two separate partial beams of the at least one light source in order to generate a different shadow image of the respective workpiece with each partial beam, wherein the separate partial beams have a different beam path length between the respective workpiece in its inspection position and the at least one camera, and wherein an optical element is arranged in at least one of the beam paths of the partial beams between the respective workpiece and the at least one camera in order to adjust an image sharpness of the different shadow images to one another in the at least one camera.

* * * * *